US008961845B2

(12) United States Patent
Sera

(10) Patent No.: US 8,961,845 B2
(45) Date of Patent: Feb. 24, 2015

(54) OPTICAL COMPENSATION FILM, AND POLARIZING PLATE AND LIQUID CRYSTAL DISPLAY EMPLOYING THE SAME

(71) Applicant: Takashi Sera, Tokyo (JP)

(72) Inventor: Takashi Sera, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 13/930,063

(22) Filed: Jun. 28, 2013

(65) Prior Publication Data

US 2013/0285280 A1 Oct. 31, 2013

Related U.S. Application Data

(63) Continuation of application No. 12/771,731, filed on Apr. 30, 2010, now abandoned, which is a continuation-in-part of application No. PCT/JP2008/069447, filed on Oct. 27, 2008.

(30) Foreign Application Priority Data

Nov. 5, 2007 (JP) ................................ 2007-287153

(51) Int. Cl.

| | |
|---|---|
| ***B29C 47/00*** | (2006.01) |
| ***B29D 11/00*** | (2006.01) |
| ***C08J 5/18*** | (2006.01) |
| ***C08L 1/10*** | (2006.01) |
| ***C08L 1/14*** | (2006.01) |
| ***C08L 1/04*** | (2006.01) |
| ***G02B 1/04*** | (2006.01) |
| *C08K 5/151* | (2006.01) |
| *G02B 5/30* | (2006.01) |

(52) U.S. Cl.

CPC ............ *B29D 11/00788* (2013.01); *C08J 5/18* (2013.01); *C08L 1/10* (2013.01); *C08L 1/14* (2013.01); *C08L 1/04* (2013.01); *G02B 1/04* (2013.01); *C08J 2339/04* (2013.01); *C08K 5/151* (2013.01); *G02B 5/3083* (2013.01)

USPC ........... 264/207; 264/204; 264/217; 264/216; 264/299; 264/1.6; 428/1.1; 428/1.31; 349/117; 349/118

(58) Field of Classification Search

USPC ........... 264/1.6, 1.7, 216, 217, 298, 299, 234, 264/236, 212, 204, 207, 176.1; 428/1.1, 428/1.31, 1.3; 349/116, 117; 359/489.07; 524/58

See application file for complete search history.

(56) References Cited

U.S. PATENT DOCUMENTS 3,291,625 A * 12/1966 Faraone et al. ............ 106/18.18
2007/0040963 A1* 2/2007 Maruyama et al. ............. 349/96

FOREIGN PATENT DOCUMENTS

JP 2000-212224 8/2000
JP 2000212224 A * 8/2000
JP 2007-138121 6/2007

OTHER PUBLICATIONS

Japanese Notice of Rejection, Application No. P2009-540017, Issue Date: Aug. 30, 2013 (2 pages).
English translation of Japanese Notice of Rejection, Application No. P2009-540017, Issue Date: Aug. 30, 2013 (2 pages).

* cited by examiner

*Primary Examiner* — Michele L Jacobson
*Assistant Examiner* — Ruiyun Zhang
(74) *Attorney, Agent, or Firm* — Lucas & Mercanti, LLP

(57) ABSTRACT

The present invention provides an optical compensation film, which has excellent visibility such as light leakage, uneven color tone and front contrast, and can simultaneously realize retardation and wavelength dispersion. The optical compensation film is characterized by containing a cellulose ester, the following polymer (a), and the following compound (b). (a) A polymer produced by copolymerizing an ethylenically unsaturated monomer having in its molecule a partial structure represented by Formula (1) with at least one ethylenically unsaturated monomer. (b) An esterified compound produced by esterifying all or a part of OH groups in a compound (A) having one furanose structure or one pyranose structure, or an esterified compound produced by esterifying all of or a part of OH groups in a compound (B) containing nor less than 2 and not more than 12 structures of at least one of a furanose structure or a pyranose structure.

Formula (1)

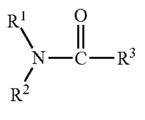

7 Claims, No Drawings

OPTICAL COMPENSATION FILM, AND POLARIZING PLATE AND LIQUID CRYSTAL DISPLAY EMPLOYING THE SAME

This is a Continuation of U.S. application Ser. No. 12/771,731 filed on Apr. 30, 2010, which was a Continuation-in-part of International Patent Application PCT/JP2008/069447, filed on Oct. 27, 2008, which claimed the priority of Japanese Patent application No. 2007-287153, filed Nov. 5, 2007, the priority of all Applications is claimed and all Applications are incorporated herein by reference.

TECHNICAL FIELD

The present invention relates to an optical compensation film used for a liquid crystal display, in particular, relates in detail to an optical compensation film which is excellent in visibility (light leakage, color tone unevenness, front contrast), and compatible to both retardation and wavelength dispersion characteristic.

TECHNICAL BACKGROUND

A cellulose ester film, a polycarbonate film, a poly cyclic olefin film, and so on are widely used as an optical film for liquid crystal displays.

Since the transparency of a cellulose ester film is optically high and also its birefringence is low, it has been mainly used as a protective film (hereinafter, referred to as a polarizing plate protective film) of a polarization film of a liquid crystal display. A polycarbonate film and a poly cyclic olefin film have mainly been used as an optical compensation film for adjusting retardation.

Moreover, in order to control retardation and its wavelength dispersion characteristic, an optical compensation film has been usually used in combination with plural sheets of optical films. However, since the combination of the plural sheets of optical films has a large load in productivity in terms of combination precision and an increase in the number of processes, an optical compensation technology with a small number of sheets has been studied.

For example, a technology to make it into one sheet with a polycarbonate film and a poly cyclic olefin film has been proposed in Non Patent document 1. However, even if such a technology is used, as an optical compensation film which serves as a polarizing plate protective film, it has an insufficient pasting ability with polyvinyl alcohol being a polarization film, and a polarizing plate protective film consisting of a cellulose ester film has been recognized to be an indispensable optical film in a liquid crystal display even now.

Then, it has been studied to provide a function as an optical compensation film to the cellulose ester film which is excellent as this polarizing plate protective film.

Basically, since cellulose ester film has the circumstances where it has been used as a polarizing plate protective film due to its low birefringence characteristic, it may be not easy to provide the function.

In order to acquire a desired retardation value, a technique to add a compound having a retardation increasing effect to a cellulose ester film and to thither stretch the film is proposed (Patent Documents 1 and 2), but there are problems that the wavelength dispersion characteristic does no stabilize over time and the permeability of the film is deteriorated by the stretching.

If the wavelength dispersion characteristic is insufficient, phenomena such as light leakage from a polarizing plate (especially light leakage with an elapse of time), uneven color tone of an image on a liquid crystal display and front contrast deterioration occur.

Therefore, it has been desired eagerly to provide a desired retardation value and a decrease of haze simultaneously to a cellulose ester film.

Patent Document 1: JP-A 2000-111914

Patent Document 2: JP-A 2002-131538

Non Patent document Japanese Liquid Crystal Society Journal Liquid Crystal "Various functional films for liquid crystal display elements" Special edition Vol. 9 No. 4

DISCLOSURE OF THE INVENTION

Problem to be Dissolved by the Invention

An object of the present invention is to provide an optical compensation film which is excellent in visibility (light leakage, color tone unevenness, front contrast) and simultaneously satisfies both retardation and wavelength dispersion properties.

Means to Solve the Problems

The above-mentioned objects of the present invention can be attained by the following structures.

1. An optical compensation film characterized by comprising following Polymer (a) and following Compound (b).

(a) A polymer produced by copolymerizing an ethylenically unsaturated monomer having a partial structure represented by Formula (1) in its molecule with at least one ethylenically unsaturated monomer.

Formula (1)

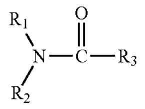

In the Formula. $R_1$, $R_2$ and $R_3$ each independently represent an aliphatic group which may have a substituent, an aromatic group which may have a substituent, or a heterocycle group which may have a substituent, provided that any two of $R_1$, $R_2$ and $R_3$ may be combined with each other to form a 5 to 7 member ring structure together with a nitrogen atom to which the two of $R_1$, $R_2$ and $R_3$ are bonded or together with the nitrogen atom and a carbon atom.

(b) An esterified compound in which all or a part of OH groups in Compound (A) having one furanose or pyranose structure are esterified, or an esterified compound in which all or a part of OH groups in Compound (B), in which 2 to 12 structures of at least one of furanose or pyranose structure are bonded, are esterified.

Any two of $R_1$, $R_2$ and $R_3$ are preferably combined with each other to form a 5 to 7 member ring structure together with a nitrogen atom to which the two of $R_1$, $R_2$ and $R_3$ are bonded or together with the nitrogen atom and a carbon atom.

2. The optical compensation film of item 1, characterized by satisfying Formulas (i), (ii) and (iii), $$20 \leq Ro \leq 100 \text{ (nm)} \quad \text{(i)}$$

$$70 \leq Rt \leq 200 \text{ (nm)} \quad \text{(ii)}$$

$$0.82 \leq Ro(480)/Ro(630) \leq 0.96 \quad \text{(iii)}$$

wherein, $Ro=(nx-ny)\times d$ $Rt=((nx+ny)/2-nz)\times d$ in the formulas, nx represents a refractive index in retarded phase axis direction in a plane of the optical compensation film, ny represents a refractive index in a direction perpendicular to the retarded phase axis direction in a plane, nz represents a refractive index in a thickness direction and d represents a thickness (nm) of the optical compensation film respectively, the measuring wavelength for the refractive index being 590 nm, and Ro (480) and Ro (630) represent Ro measured with the wavelength of 480 nm and Ro measured with the wavelength of 630 nm, respectively.

3. The optical compensation film of item 1, characterized by that weight average molecular weight (Mw) of the Polymer (a) is within a range of 1,000 to 70,000.

4. The optical compensation film of item 1, characterized by that ethylenically unsaturated monomer having a substructure represented by Formula (1) in a molecule is N-vinyl pyrrolidone, N-acryloyl morpholine, N-vinyl piperidone, N-vinyl caprolactam, or a mixture thereof.

5. The optical compensation film of item 1, characterized by that the esterified compound is benzoate of monosaccharide (α-glucose, β-fructose) or benzoate of polysaccharide prepared by dehydration condensation of arbitrary two or more parts of —$OR_{12}$, —$OR_{15}$, and —$OR_{25}$ in monosaccharide represented by Formula (2), in which m+n=2 to 12.

Formula (2)

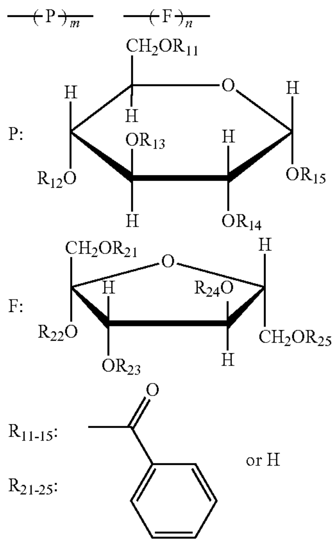

6. A polarizing plate characterized by employing the optical compensation film of any one of above described items 1 to 5 on at least one surface of a polarizing plate.

7. A liquid crystal display characterized by employing the polarizing plate of above described item 6 on at least one surface of a liquid crystal cell.

Advantage of the Invention

An optical compensation film having excellent visibility such as light leakage, color tone unevenness, front contrast and having compatibility of retardation and wave length dispersion properties can be provided by this invention.

BEST EMBODIMENT TO PRACTICE THE INVENTION

The best embodiment to practice the invention is described in detail, however this invention is not restricted thereto.

The liquid crystal display elements generally have viewing angle characteristics, and there is problem of lowering contrast when observed remote angle from normal angle. It is known that it is effective to provide an optical compensation film (a phase difference film) between the crystal cell and a polarizer to dissolve this problem. It is preferable in general the retardation within a plane (Ro) in the range of 20 to 200 nm, and the retardation in the thickness direction (Rt) in the range of 70 to 400 nm.

The optical compensation film of this invention is characterized by comprising Polymer (a) manufactured by copolymerizing an ethylenically unsaturated monomer having a partial structure represented by Formula (1) in its molecule with at least one ethylenically unsaturated monomer, and esterified Compound (b) in which all or apart of OH groups in Compound (A) having one furanose or pyranose structure are esterified, or an esterified compound in which all or a part of OH groups in Compound (B), in which 2 to 12 of at least one type of furanose or pyranose stricture are bonded, are esterified.

Further improvement of visibility such as front contrast is expected according to generalization of large format liquid crystal display recently. The inventors studied the above mentioned problem and found that improvement of visibility (light leakage color tone unevenness, front contrast) in addition to compatibility of retardation control and wave length dispersion property are attained by employing Polymer (a) obtained by copolymerizing ethylenically unsaturated monomer having a partial structure represented by Formula (1) in its molecule with at least one ethylenically unsaturated monomer, and accomplished this invention.

The elements of this invention will be described in detail.

Polymer (a) Mentioned Above

The optical compensation film of this invention comprises at least one polymer manufactured by copolymerizing an ethylenically unsaturated monomer having a partial structure represented by Formula (1) in its molecule with at least one ethylenically unsaturated monomer.

In Formula (A), $R_1$, $R_2$ and $R_3$ each independently represent an aliphatic group which may have a substituent, an aromatic group which may have a substituent, or a heterocycle group which may have a substituent, provided that any two of $R_1$, $R_2$ and $R_3$ may be combined with each other to form a 5 to 7 member ring structure together with a nitrogen atom to which the two of $R_1$, $R_2$ and $R_3$ are bonded or together with the nitrogen atom and a carbon atom. The substituents represented by $R_1$, $R_2$ and $R_3$ are not specifically limited. Examples of substituents represented by $R_1$, $R_2$ and $R_3$ include an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propargyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acyl group (such as an acetyl group, a pivaloyl group and a benzoyl group), a cathamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid gulp, a salt of sulfonic acid, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamino gulp, a chlorophenylamino group, a toluidino group, an anisidino group, a naphthylamino group and a 2-pyridylamino group), an imido group, a ureido group (such as a methylureido group, an ethylureido group, a pentylureido gout), a cyclohexylureido group, an octylureido group, a dodecylureido group, a phenylureido group, a naphthylureido group and a 2-pyridylaminoureido group), an alkoxycarbonylamino group (such as a methoxycarbonylamino group and a phenoxycarbonylamino gulp), an alkoxycarbonyl group (such as methoxycarbonyl group, ethoxycarbonyl group and phenoxycarbonyl group), an aryloxycarbonyl group (such as a phenoxycarbonyl group), a heterocyclicthio group, a thioureido group, a carboxyl group, a salt of carboxylic acid, a hydroxyl group, a mercapto group and a nitro group. These groups may be further substituted by a similar substituent to those represented by $R_1$, $R_2$ and $R_3$.

In the present invention, any two of $R_1$, $R_2$ and $R_3$ may be combined with each other to form a 5 to 7 member ring structure together with a nitrogen atom to which the two of $R_1$, $R_2$ and $R_3$ are bonded or together with the nitrogen atom and a carbon atom. In this case, the ring may further contain a nitrogen atom, a sulfur atom or an oxygen atom, and the ring may be a saturated or unsaturated single ring a polycyclic ring or a condensed ring. Examples of such a ring include hetero rings such as a pyrrolidine ring a piperidine ring, a piperazine ring a pyrrole ring, a morpholine ring, a thiamorpholine ring, an imidazole ring, a pyrazole ring a pyrrolidone ring, and a piperidone ring. These rings may further be substituted by the substituents which the group represented by the above $R_1$, $R_2$, and $R_3$ may have thither.

In the present invention, the ethylenically unsaturated monomer having a substructure represented by Formula (1) in the molecule has an ethylenically unsaturated bond in the molecule. This means that at least one of the groups represented by $R_1$, $R_2$ and $R_3$ is an alkenyl group as a group having an ethylenically unsaturated bond, or at least one of the groups represented by $R_1$, $R_2$ and $R_3$ has an ethylenically unsaturated bond as a substructure Specific examples of an ethylenically unsaturated bond include a vinyl group, an allyl group, an acryloyl group, a methacryloyl group, a styryl group, an acrylamide group, a methacrylamide group, a vinyl cyanide group, a 2-cyanoacryloxy group, a 1,2-epoxy group, a vinylbenzyl group, and a vinylether group. Of these, preferable am a vinyl group, an acryloyl group, a methacryloyl group and a methacrylamide group.

Examples of an ethylenically unsaturated monomer having a substructure represented by Formula (1) employed in the present invention will be shown below, however, the present invention is not limited thereto.

AM-1

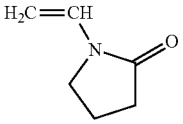

AM-2

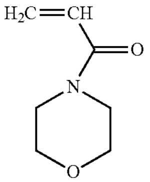

AM-3

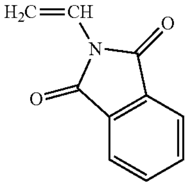

AM-4

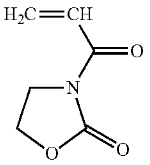

AM-5

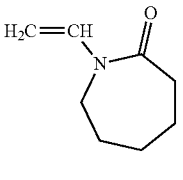

AM-6

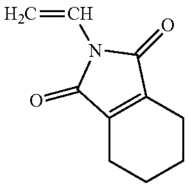

AM-7

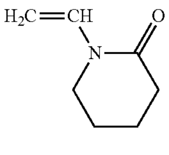

7
-continued
AM-8
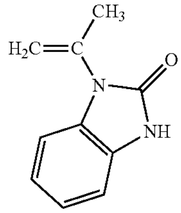
AM-9
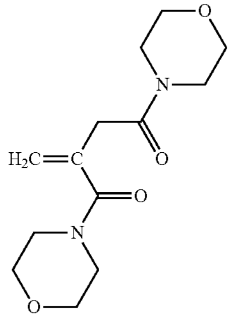
AM-10
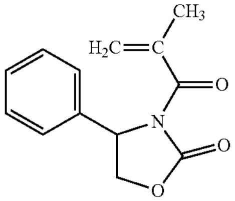
AM-11
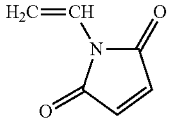
AM-12
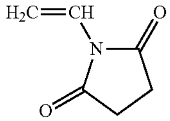
AM-13
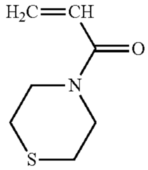
AM-14
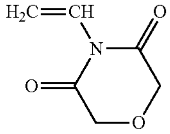
AM-15
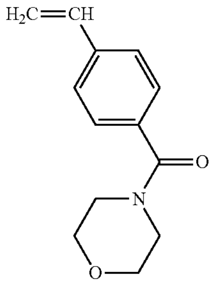
8
-continued
AM-16
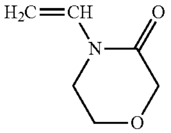
AM-17
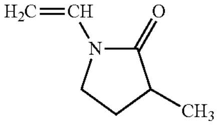
AM-18
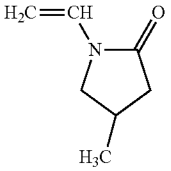
AM-19
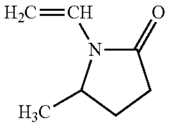
AM-20
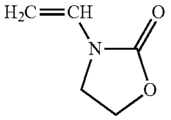
AM-21
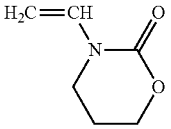
AM-22
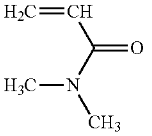
AM-23
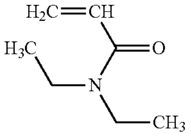
AM-24
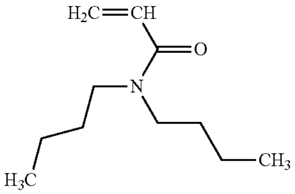
AM-25
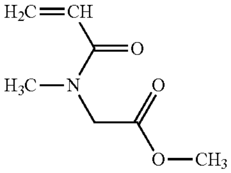

-continued
AM-26
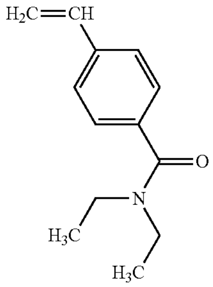
AM-27
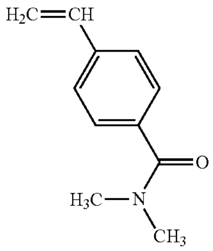
AM-28
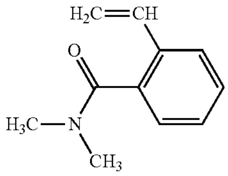
AM-29
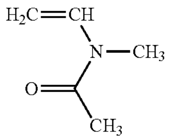
AM-30
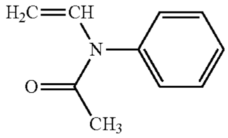
AM-31
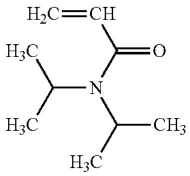
AM-32
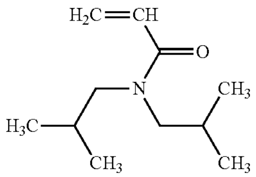
AM-33
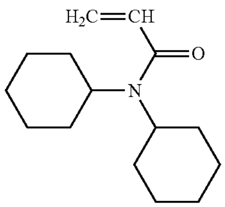
-continued
AM-34
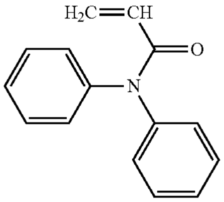
AM-35
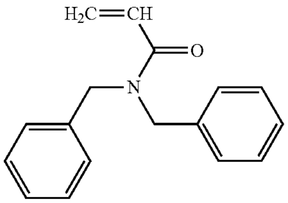
AM-36
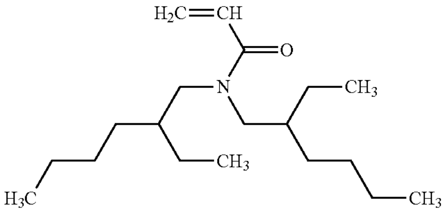
AM-37
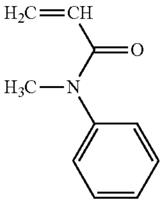
AM-38
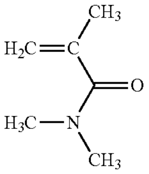
AM-39
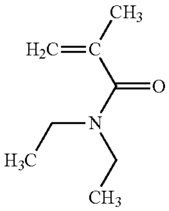
AM-40
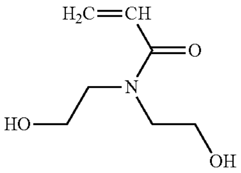
AM-41
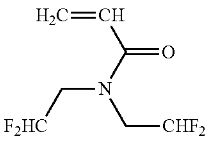

-continued

AM-42

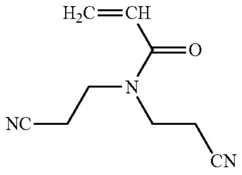

AM-43

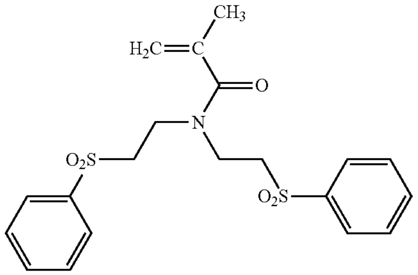

AM-44

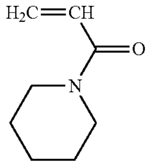

AM-45

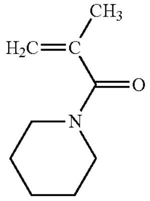

AM-46

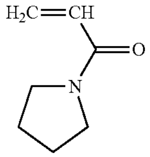

AM-47

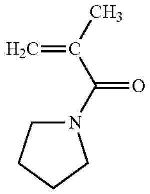

AM-48

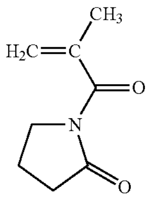

AM-49

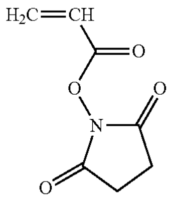

-continued

AM-50

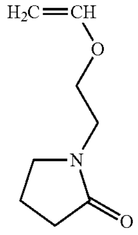

AM-51

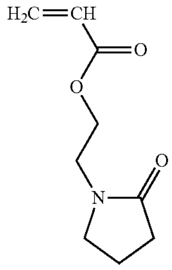

AM-52

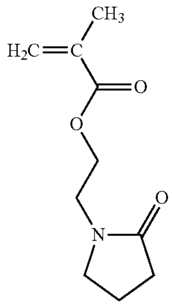

AM-53

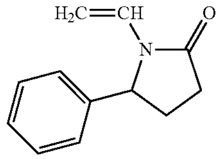

The ethylenically unsaturated monomer having a substructure represented by Formula (1) in the molecule may be used alone or in combination of two or more kinds. Specifically preferable examples include N-vinyl pyrrolidone, N-acryloyl morpholine, N-vinyl piperidone, N-vinyl caprolactam, or a mixture thereof, more preferably N-vinyl pyrrolidone, N-acryloyl morpholine or a mixture thereof, and particularly preferably N-acryloyl morpholine.

The ethylenically unsaturated monomer having a substructure represented by Formula (1) in the molecule are commercially available in the market or may be synthesized by referring to known documents in the art.

Examples of an ethylenical unsaturated monomer capable of copolymerization with the ethylenically unsaturated monomer having a substructure represented by Formula (1) in the molecule may be the ethylenically unsaturated monomer having a substructure represented by Formula (1) in the molecule, but preferably other unsaturated monomers, for example, a methacrylic acid or its ester derivative (such as methyl methacrylate, ethyl methacrylate, propyl methacrylate, butyl methacrylate, i-butyl methacrylate, t-butyl methacrylate, octyl methacrylate, cyclohexyl methacrylate, 2-hydroxyethyl methacrylate, 2-hydroxypropyl methacrylate, tetrahydrofurfuryl methacrylate, benzyl methacrylate, dimethylaminoethyl methacrylate and diethylaminoethyl methacrylate), acrylic acid or its ester derivative (such as methyl acrylate, ethyl acrylate, propyl acrylate, butyl acrylate, i-butyl acrylate, butyl acrylate, octyl acrylate, cyclohexyl acrylate, 2-hydroxyethyl acrylate, 2-hydroxypropyl acrylate, tetrahydrofurfuryl acrylate, 2-ethoxyethyl acrylate, diethyleneglycolethoxylate acrylate, 3-methoxybutyl acrylate, benzyl acrylate, dimethylamino acrylate and diethylamino acrylate), an alkyl vinylether (such as methyl vinylether, ethyl vinylether, and butyl vinylether), an alkyl vinylester (such as vinyl formate, vinyl acetate, vinyl butylate, vinyl caproate, and vinyl stearate), a styrene derivative (such as styrene, α-methylstyrene, o-methylstyrene, m-methylstyrene, p-methylstyrene and vinyl naphthalene), crotonic acid, maleic acid, fumaric acid, itaconic acid, acrylonitrile, methacrylonitrile, vinyl chloride, vinylidene chloride, acrylamide, N,N-dimethyl amide and methacrylamide. These monomers may be used alone or in combination of two or more kinds to polymerize with monomers represented by Formula (1).

Preferable examples among these ethylenically unsaturated monomers are acrylate and methacrylate (such as methyl methylacrylate, ethyl methylacrylate, propyl methacrylate, butyl methacrylate, methyl acrylate, methyl acrylate, ethyl acrylate, propyl acrylate and butyl acrylate), alkyl vinylester (such as vinyl formate, vinyl acetate, vinyl butylate, vinyl caproate, and vinyl stearate), styrene derivative (such as styrene, α-methylstyrene, o-methylstyrene, m-methylstyrene, p-methylstyrene and vinyl naphthalene), and methylmethacrylate and methyl acrylate are more preferable and methyl methacrylate is most preferable.

Weight average molecular weight (Mw) of the above mentioned Polymer (a) used in this invention is preferably within a range of 1,000 to 70,000. More preferably is within the range of 2,000 to 50,000, and particularly preferable is within the range of 3,000 to 30,000. Ratio of weight average molecular weight (Mw)/number average molecular weight (Mn) of the Polymer (a) is preferably 1.5 to 10.0, and particularly preferable is 1.5 to 5.0.

The above mentioned Polymer (a) used in this invention is a copolymer obtained by polymerizing an ethylenically unsaturated monomer having a partial structure represented by Formula (1) in its molecule with at least one ethylenically unsaturated monomer and preferably at least methyl(meth) acrylate, and preferably has weight average molecular weight within a range of 3,000 to 30,000. N-acryloyl morpholine is above exemplified AM-2, methyl(meth)acrylate includes methyl methacrylate and methyl acrylate.

Mn and Mn/Mw are determined using gel permeation chromatography according to the following manner.

Measurement conditions are as follows:

Solvent: tetrahydrofuran

Apparatus: HLC-8220 GPC (produced by TOSOH Corp.)

Column: TSK gel SUPER HM-M (produced by TOSOH Corp.)

Temperature: 40° C.

Sample concentration: 0.1% by weight

Amount of injection: 10 μl

Flow rate: 0.6 ml/min

Calibration curve: standard polystyrene PS-1 (produced by Polymer Laboratories)

There was used a calibration curve prepared by 9 samples of standard polystyrene having Mw=2,560,000 to 580.

The content of an ethylenically unsaturated monomer having a substructure represented by Formula (1) in the molecule in the Polymer (a) used in the present invention is determined by considering compatible solubility of the copolymer to be obtained with transparent resin, and affects to transparency and mechanical strength of the optical compensation film. The ethylenically unsaturated monomer having a substructure represented by Formula (1) in the molecule is preferably incorporated in an amount of 5 to 80% by weight, more preferably 10 to 50% by weight of the copolymer.

The method of polymerizing the Polymer (a) of the present invention is not specifically limited, and conventional methods can be widely employed, examples of which include a radical polymerization, an anionic polymerization and a cationic polymerization. As an initiator used for the radical polymerization, for example, an azo compound and a peroxide are cited examples of which include azobis isobutyronitrile (AIBN), an azobis isobutyric acid diester derivative and peroxy benzoyl. Solvents used in the polymerization are not particularly limited and examples thereof include an aromatic hydrocarbon solvent such as toluene and chlorobenzene, a halogenated hydrocarbon solvent such as dichloroethane and chloroform, an ether solvent such as tetrahydrofuran and dioxane, an amide solvent such as dimethyl formamide, an alcohol solvent such as methanol, an ester solvent such as methyl acetate and ethyl acetate, a ketone solvent such as acetone, cyclohexanone and methylethyl ketone, and an aqueous solvent. By selecting a solvent, a solution polymerization carried out in a homogenous system, a precipitation polymerization in which produced polymer precipitates an emulsion polymerization carried out in a micelle state, suspension polymerization in which polymerization is carried out in suspension state and bulk polymerization under circumstances can also be conducted.

The weight average molecular weight of the above mentioned polymer can be controlled according to a conventional method of controlling the molecular weight. As such a molecular weight control method, a method to add a chain transfer agent, for example, carbon tetrachloride, lauryl mercaptan or octyl thioglycolate may be cited. The polymerization temperature is usually from an ambient temperature to 130° C. and more preferably 50° C. to 110° C.

The content of the above mentioned Polymer (a) based on the mass of the cellulose ester resin which forms the optical compensation film is preferably 0.1 to 50% by weight and more preferably 5 to 30% by weight. The haze of the formed optical film is not specifically limited if it is 1.0 or less, however, the haze of the formed optical film is preferably 0.5 or less and more preferably 0.3 or less.

<Compound Having Furanose Structure or Pyranose Structure According to this Invention>

The optical compensation film is characterized by containing Polymer (a) as well as an esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified. The esterified compound of (A) and the esterified compound of (B) are called a sugar ester compound in this invention.

Further, the above mentioned esterified compound is preferably benzoate of monosaccharide (α-glucose, β-fructose) or benzoate of polysaccharide prepared by dehydration condensation of arbitrary two of $—OR_{12}$, $—OR_{15}$, $—OR_{22}$ and $—OR_{25}$ in monosaccharide represented by the aforesaid Formula (2), in which m+n=2 to 12.

The benzoyl group may be further have a substituent which includes such as an alkyl group, an alkenyl gulp, an alkoxy group and a phenyl group, and the alkyl, alkenyl and phenyl group may further have a substituent.

Preferable examples of the Compound (A) and Compound (B) include the following; how/ever, this invention is not limited thereto.

Examples of the Compound (A) are listed as glucose, galactose, mannose, fructose, xylose and arabinose.

Examples of the Compound (B) are listed as lactose, sucrose, nistose, 1F-fructosyl nistose, stachyose, maltitol, lactitol, lactulose, cellobiose, maltose, cellotriose, maltotriose, raffinose or kestose. In addition to these, listed are such as gentiobiose, gentiotriose, gentiotetraose, xylotriose and galactosylscurose. Among these the Compound (A) and Compound (B), compounds having the both of a pyranose. Such as sucrose, kestose, nistose, 1F-fructosyl nistose and stachyose are preferable, and sucrose is more preferable. The compound bonding 2 or 3 of at least one type of furanose structure and pyranose structure in Compound (B) is a preferable embodiment.

Monocarboxylic acid utilized for esterification of a part of or all of OH groups in the Compound (A) and Compound (B) according to this invention is not specifically limited, and conventional compound such as aliphatic monocarboxylic acid, alicyclic monocarboxylic acid and aromatic monocarboxylic acid can be utilized. Carboxylic acid utilized may be one type or a mixture of not less than two types.

Preferable aliphatic monocarboxylic acid includes saturated fatty acid such as acetic acid, propionic acid, butyric acid, isobutyric acid, valeric acid, caproic acid, enanthic aid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, archaic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid, arachidonic acid and octenoic acid.

Examples of preferable alicyclic monocarboxylic acid include cyclopentanecarboxylic acid, cyclohexanecarboxylic acid, cyclooctanecarboxylic acid or derivatives thereof.

Examples of aromatic monocarboxylic acid include aromatic monocarboxylic acid in which an alkyl group or an alkoxy group is introduced to a benzene ring of such as benzoic acid and toluic acid; aromatic monocarboxylic acid having at least two benzene rings such as benzilic acid, biphenyl carboxylic acid, naphthalene carboxylic acid, tetralin carboxylic acid or derivatives thereof and more specifically, include xylylic acid, hemellitie acid, mesitylenic acid, prehnitylic acid, γ-isodutylic acid, durylic acid, mesitonic acid, α-isodurylic acid, cuminic acid, α-toluic acid, hydroaropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resortylic acid, vanillic acid, isovanillic acid, veratric acid, o-veratric acid, gallic acid, asarylic acid, mandelic acid, homoanisic acid, homovanillic acid, homoveratric acid, o-homoveratric acid, phthalonic acid and p-coumaric acid; specifically preferable is benzoic acid.

Among the esterified compounds of Compound (A) and Compound (B) is preferably an acetylated compound in which acetyl group is introduced by esterification.

A manufacturing method of the acetylated compound is described in, for example, JP-A H08-245678.

In addition to the esterified compounds of Compound (A) and Compound (B), an ester compound of oligosaccharide can be applied as a compound having 1 to 12 of at least one type of a pyranose stricture or a furanose structure according to this invention.

Oligosaccharide is manufactured by acting an enzyme such as amylase on such as starch and saccharose, and oligosaccharide applicable in this invention includes such as maltooligosaccharide, isomaltooligosaccharide, furactooligosaccharide, galactooligosaccharide and xylooligosaccharide.

Oligosaccharide can be acetylated by the similar method to those of Compound (A) and Compound (B).

An example of manufacturing method of the esterified compound.

Acetic anhydride (200 ml) was dripped to a solution of glucose (29.8 g, 166 mmol) in 100 ml of pyridine, and reaction was conducted for 24 hours. Solution was condensed by evaporation, and poured into iced water. After standing for one hour, solid was separated from water by a glass filter. Solid on the glass filter was dissolved with chloroform, and was separated by cold water until neutralization. Organic phase was separated and dried with anhydrous sodium sulfate. After removing anhydrous sodium sulfate by filtration, chloroform was removed by evaporator, and glucose pentaacetate (58.8 g, 150 mmol, yield of 90.9%) was thus obtained. Monocarboxylic acid described above can be used instead of the above mentioned acetic anhydride.

In the following, specific examples of an esterified compound according to this invention will be listed; however, this invention is not limited thereto.

Compound 1

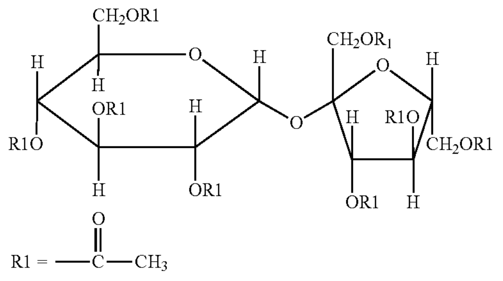

Compound 2

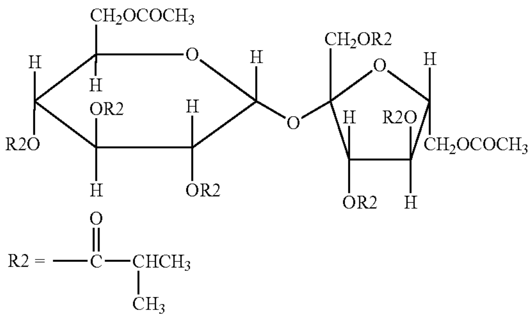

-continued
Compound 3
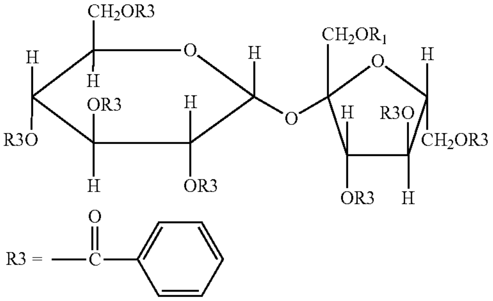
Average substitution degree: 8.0
Compound 4
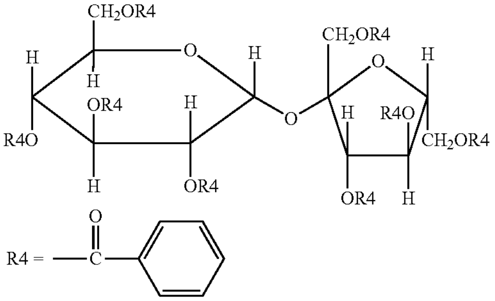
Average substitution degree: 6.5
Compound 5
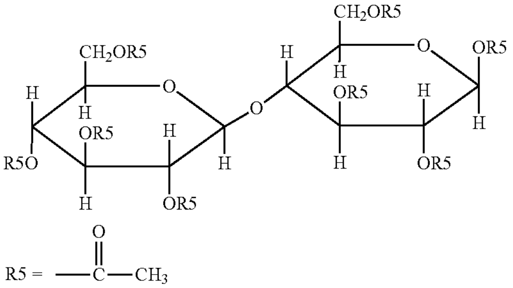
Compound 6
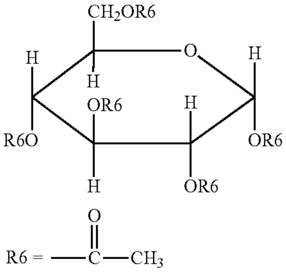
Compound 7
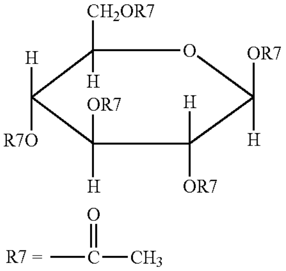
Compound 8
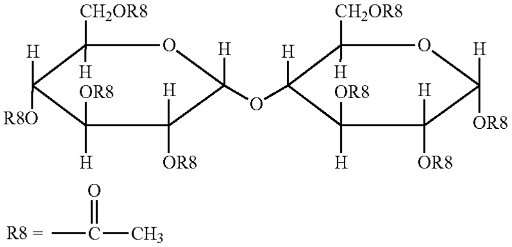
Compound 9
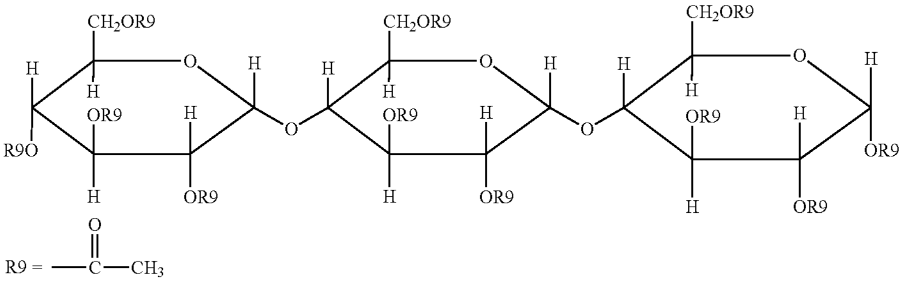

-continued
Compound 10
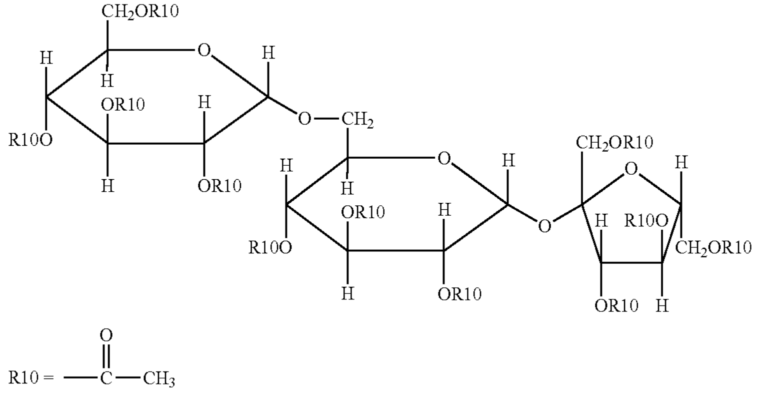
Compound 11
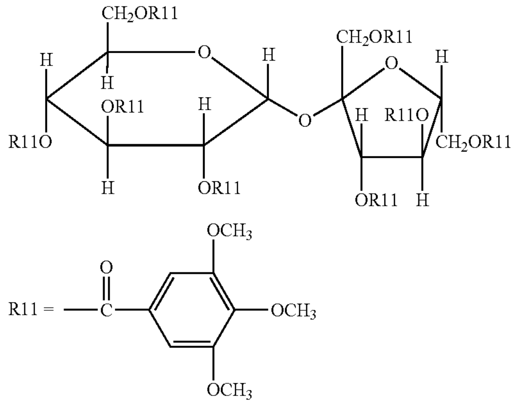
Compound 12
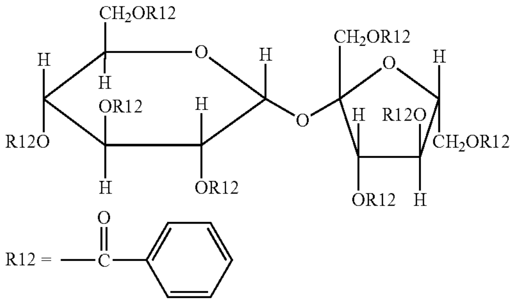
Average substitution degree: 7.0
Compound 13
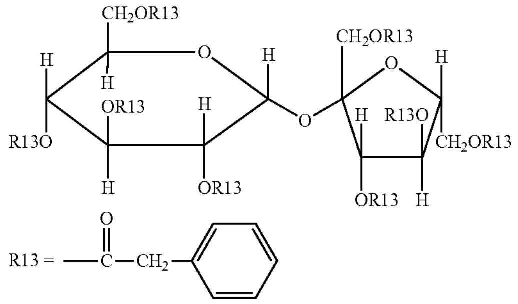
Compound 14
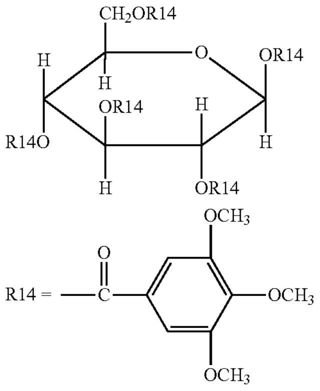
Compound 15
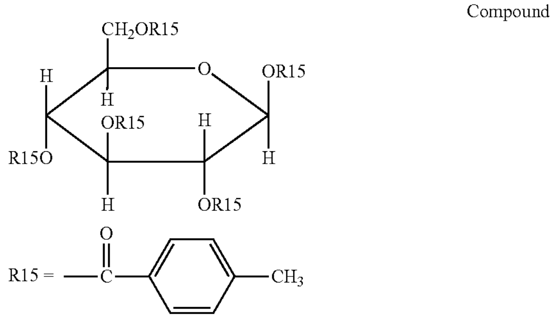
Compound 16
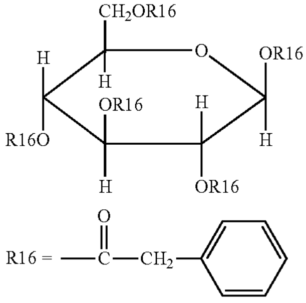

-continued
Compound 17
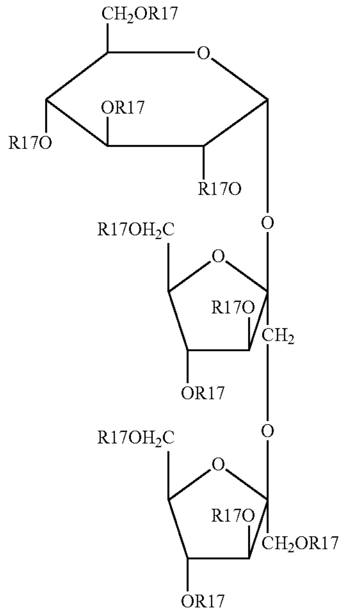
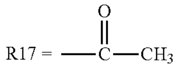
Compound 18
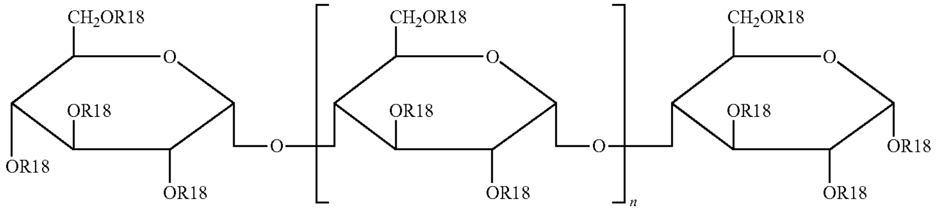
n = 2-8
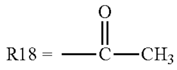
Compound 19
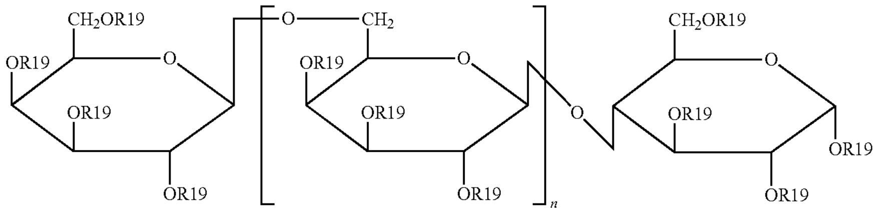
n = 1-8
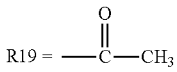

-continued
Compound 20
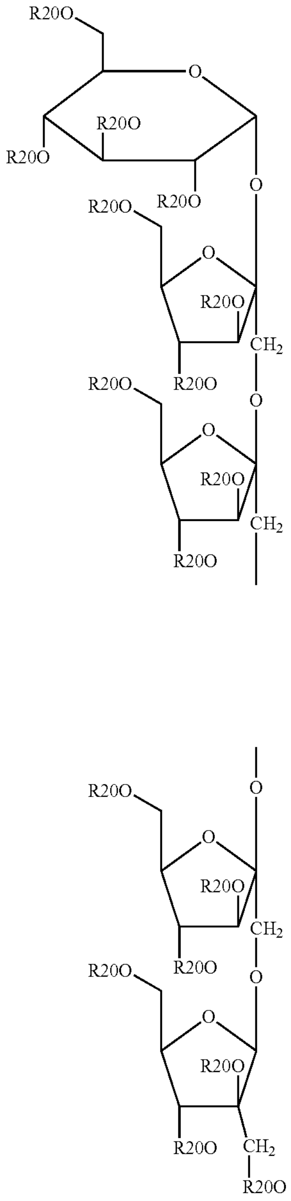
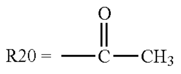
Compound 21
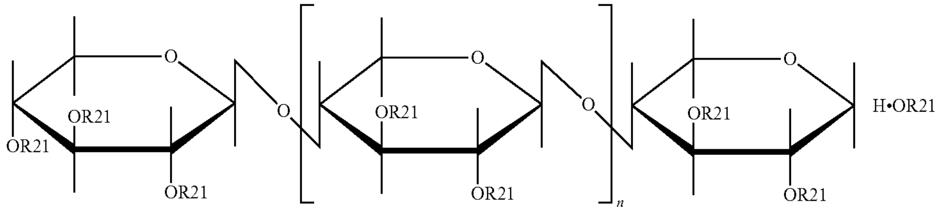
n = 1-8
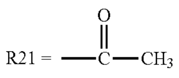

-continued

Compound 22

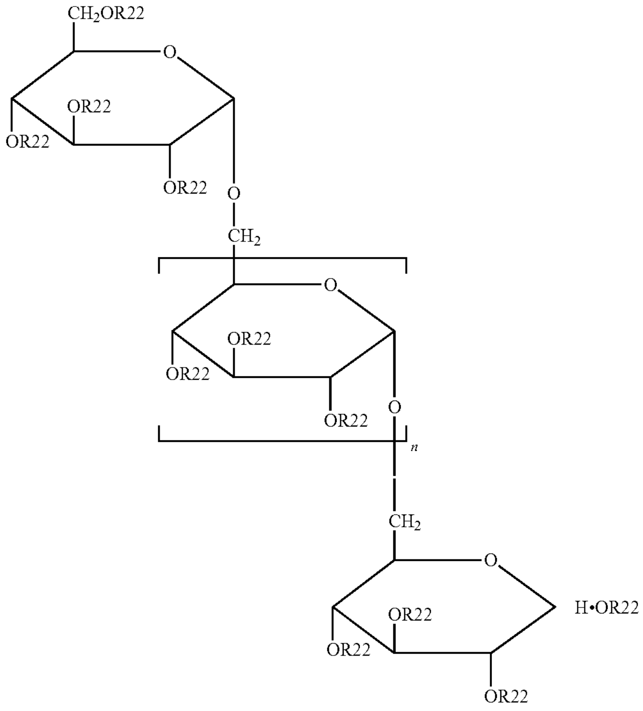

n = 1-8

R22 = 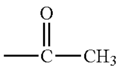

Optical film of this invention preferably contains 1 to 30 weight % of esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified, and specifically preferably contains 5 to 30 weight %, for the purpose of inhibiting variation of phase difference to stabilize display quality. It is preferable that an excellent effect of this invention is exhibited as well as no bleed out is generated in the case of this range.

The Polymer (a) and all or a part of OH groups in Compound (A) having one furanose structure or pyranose structure or Compound (B) bonding 2 to 12 of at least one type of furanose structures or pyranose structures may be used in combination with other plasticizer.

(Cellulose Ester)

The optical compensate film of this invention contains cellulose ester. The cellulose ester is not specifically limited; however, cellulose ester is carboxylic acid ester having a carbon number of approximately 2 to 22, may be ester of aromatic carboxylic acid and specifically preferably is lower fatty acid ester of cellulose. In lower fatty acid ester of cellulose, lower fatty acid means fatty acid having a carbon number of not more than 6. An acyl group bonding to a hydroxyl group may be a straight chain or a branched chain, or may form a ring. Further, the acyl group may be substituted by other substituents. In the case of a same substitution degree, it is preferable to select among acyl groups having a carbon number of preferably 2 to 6. The carbon number of the aforesaid cellulose ester is preferably 2 to 4 and more preferably 2 to 3.

The aforesaid cellulose ester can employ acyl pinups derived from mixed acid, and specifically preferably can employ acyl groups having carbon numbers of 2 and 3, or carbon numbers of 2 and 4. As cellulose ester of this invention, utilized can be mixed fatty acid ester of cellulose, in which propionate group or a butyrate group bonds in addition to an acetyl group, such as cellulose acetate propionate, cellulose acetate butyrate or cellulose acetate propionate butyrate. Herein, as a butyryl group to form butyrate may be either a straight chain form or branched. As cellulose ester of this invention, cellulose acetate, cellulose acetate butyrate, cellulose acetate propionate and cellulose acetate phthalate are specifically preferably utilized.

The retardation value can be suitably controlled by selecting kinds of above mentioned acyl group of the cellulose ester and substitution degree of the acyl group to pyranose ring of cellulose resin skeleton.

Cellulose satisfying the following Formulas (1) and (2) simultaneously is preferably used in this invention.

$$2.0 \leq X+Y \leq 2.9$$ Formula (1)

$$0.1 \leq Y \leq 2.0$$ Formula (2)

In the formulas, X is substitution degree of acetyl group, Y is substitution degree of propionyl group or butylyl group. Those satisfying the two Formulas are suitable for manufacturing the optical compensation film exhibiting excellent optical property according to the object of this invention.

Resins having different substitution degree may used by mixture to obtain optical property suitable for the object of this invention.

Of these, cellulose acetate propionate is preferably employed. Cellulose acetate propionate satisfies $1.0 \le X \le 2.5$, and it is preferable to use cellulose esters satisfying the following formulas of $0.1 \le Y \le 1.5$, and $2.0 \le X+Y \le 3.0$. The acyl substitution degree of the cellulose ester can be measured according to ASTM-D817-96.

In case that the substitution degree of the acyl group is too low, unreacted parts of hydroxy groups in the pyranose ring composing cellulose resin skeleton, and it may cause variation of retardation by moisture or lowering the ability of protecting polarizer as the polarizing plate protective film because a plenty of hydroxy groups reside.

The number average molecular weight of the cellulose ester is preferably 60,000 to 300,000 to obtain film having good mechanical strength and those of 70,000 to 200,000 are used more preferably.

The number average molecular weight of the cellulose ester is measured according to a method described below.

Measurement is carried out under the conditions described below, employing a high speed liquid chromatography.

Solvent: Acetone
Column: MPW×1 (manufactured by TOSOH Corp.)
Sample concentration: 0.2 weight/volume percent
Flow rate: 1.0 ml/minute
Injected sample volume: 300 μl
Standard sample: Standard polymethyl methacrylate
Temperature: 23° C.

Cellulose as raw material for a cellulose ester used in the present invention is not particularly limited, and may be various kinds of cotton linter, wood pulp kenaf and so on may be listed. Cellulose esters made from these may be optimally mixed or singly used.

Cellulose ester according to this invention, in the case that an acylation agent as a cellulose starting material is acid anhydride, is prepared by a reaction utilizing a proton type catalyst such as sulfuric acid in an organic acid such as acetic acid or in an organic solvent such as methylene chloride. In the case that an acylation agent is acid chloride ($CH_3COCl$, $C_2H_5COCl$ or $C_3H_7COCl$), the reaction is performed utilizing a basic compound such as amine as a catalyst. Specifically, the synthesis can be performed referring to a method described in JP-A H10-45804.

An average substitution degree of an acyl group at the 6-position of a glucose unit of cellulose ester utilized in this invention is preferably 0.5 to 0.9.

A highly reactive primary hydroxyl group is present at the 6-position of a glucose unit constituting cellulose ester, different from the 2-position and the 3-position, and this primary hydroxyl group preferentially forms sulfuric ester in a manufacturing process of cellulose ester employing sulfuric acid as a catalyst. Therefore, in an esterification reaction of cellulose, the average substitution degree at the 2-position and the 3-position of a glucose unit can be made larger that that at the 6-position by increasing the amount of sulfuric acid as a catalyst, compared to general cellulose ester. Further, when necessary, since a hydroxyl group at the 6-position of a glucose unit can be selectively protected when cellulose is tritylated, it is possible to make the average substitution degree at 2-position and the 3-position of a glucose unit larger than that at the 6-position, by protecting a hydroxyl group at the 6-position by tritylation and releasing a trityl group (a protective group) after esterification. Specifically, cellulose ester manufactured by a method described in JP-A 2005-281645 can be also preferably utilized.

It is necessary to prolong the time of an acetylation reaction to increase an acetylation degree in the case of acetyl cellulose. However, when the reaction time is excessively long, decomposition will proceed simultaneously to cause such as cut off of a polymer chain and decomposition of an acetyl group, which leads to an unfavorable result. Therefore, it is necessary to set the reaction time of a certain range to increase the acetylation degree and depress decomposition to some extent. To regulate by reaction time is not suitable because the reaction conditions are various to be changed depending on the reaction equipment and installation and other conditions. Since molecular weight distribution is broadened as decomposition of polymer proceeds, also in the case of cellulose ester, the degree of decomposition can be determined by a value of weight average molecular weight (Mw)/number average molecular weight (Mn), which is generally utilized. That is, in a process of acetylation of cellulose triacetate, a value of weight average molecular weight (Mw)/number average molecular weight (Mn) can be utilized as one index not to advance decomposition too much due to prolonged reaction time but to perform acetylation reaction for sufficient time.

An example of a manufacturing method of cellulose ester will be shown below. Cotton linter of 100 weight parts as a cellulose starting material was crushed, being added with 40 weight parts of acetic acid, and the resulting system was subjected to a pretreatment activation at 36° C. for 20 minutes. Thereafter, the system was added with 8 weight parts of sulfuric acid, 260 weight parts of acetic acid anhydride and 350 weight parts of acetic acid, and the resulting system was subjected to esterification at 36° C. for 120 minutes. After neutralization with 11 weight parts of a 24% magnesium acetate aqueous solution, saponification repining at 63° C. for 35 minutes was performed to prepare acetyl cellulose. The product, after having been stirred for 160 minutes at room temperature by use of 10 times of an acetic acid aqueous solution (acetic acid/water=1/1 (weight ratio)), was filtered and dried to prepare purified acetyl cellulose having an acetyl substitution degree of 2.75. This acetyl cellulose had Mn of 92,000, Mw of 156,000 and Mw/Mn of 1.7. In a similar manner, by adjusting esterification conditions (temperature, time, stirring) and hydrolysis conditions, cellulose ester having a different substitution degree and a different Mw/Mn can be synthesized. Cellulose ester having an Mw/Mn ratio of 1.4 to 5.0 is preferably utilized.

Cellulose ester synthesized is preferably subjected to purification to remove a low molecular weight component and to filtration to remove a component which has not been acetylated or has a low acetylation degree.

Further, mixed acid cellulose ester can be prepared by a method described in JP-A H10-45804.

Cellulose ester is also affected by trace amounts of metal components in cellulose ester. These are considered to be related with water utilized in a manufacturing process, and a component which forms insoluble nuclei is preferably as small as possible in quantity; and metal ions of such as iron, calcium and magnesium, which may form an insoluble product by salt formation with such as polymer decomposition product possibly containing an organic acid group, are preferably small in quantity. An iron (Fe) component is preferably not more than 1 ppm. A calcium (Ca) component is easily form a coordination compound, that is a complex, with a acid component such as carboxylic acid and sulfonic acid as well as with many ligands, to form many insoluble scum (insoluble sediment, muddiness) derived from calcium.

A calcium (Ca) component is not more than 60 ppm and preferably 0 to 30 ppm. A magnesium (Mg) component is preferably 0 to 70 ppm and specifically preferably 0 to 20 ppm, since an excess amount thereof also generates an insoluble product. Metal components such as a content of iron (Fe), calcium (Ca) and magnesium (Mg) can be analyzed by use of an ICP-AES (an induction coupling plasma emission spectrophotometer) after completely dried cellulose ester is subjected to pretreatment by a micro-digest wet decomposition apparatus (sulfuric nitric acid decomposition) and alkali fusion.

(Plasticizer)

Optical compensate film of this invention can be appropriately incorporated with a plasticizer to achieve the effects of this invention. A plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acryl type plasticizer. When not less than two types among them are utilized at least one type is preferably a polyhydric alcohol ester type plasticizer.

A polyhydric alcohol ester type plasticizer is a plasticizer comprising ester of fatty acid polyhydric alcohol of not less than divalent and monocarboxylic acid, and is preferably provided with an aromatic ring or a cycloalkyl ring in a molecule. It is preferably fatty acid polyhydric alcohol ester of 2 to 20 valent.

Polyhydric alcohol preferably utilized in this invention is represented by following formula (a).

$R1\text{-}(OH)n$ Formula (a)

wherein, R1 is a n-valent organic gap, n is a positive integer of not less than 2 and OH is an alcoholic and/or phenolic hydroxyl group.

Examples of preferable polyhydric alcohol include such as the following; however, this invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically preferable are triethylene glycol, tetraethylene glycol, dipropylene glycol, tripropylene glycol, sorbitol, trimethylolpropane and xylitol.

Monocarboxylic acid utilized in polyhydric alcohol ester is not specifically limited and such as conventionally known fatty acid monocarboxylic acid, alicyclic monocarboxylic acid and aromatic monocarboxylic acid can be utilized. It is preferable to utilize alicyclic monocarboxylic acid or aromatic monocarboxylic acid with respect to improvement of moisture permeability and reservation property.

Examples of preferable monocarboxylic acid include the followings; however, this invention is not limited thereto.

As fatty acid monocarboxylic acid, fatty acid having a straight chain or a branched chain of carbon number of 1 to 32 can be preferably utilized. The carbon number is more preferably 1 to 20 and specifically preferably 1 to 10. It is preferable to incorporate acetic acid because of increasing compatibility with cellulose ester, and it is also preferable to utilize acetic acid and other monocarboxylic acid by mixing.

Preferable monocarboxylic acid includes saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, steric acid, nonadecanoic acid, arachic acid, behenic acid, lipoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid or derivatives thereof.

Examples of preferable aromatic monocarboxylic acid include those in which 1 to 3 of alkoxy groups such as an alkyl group, a methoxy group or an ethoxy group are introduced into a benzene ring of such as benzoic acid and toluic acid, aromatic carboxylic acid having at least two benzene ring such as biphenyl carboxylic acid, naphthalene carboxylic acid and tetralin carboxylic acid, or derivatives thereof. Benzoic acid is specifically preferable.

A molecular weight of polyhydric alcohol ester is not specifically limited, however, is preferably 300 to 1,500 and more preferably 350 to 750. The molecular weight is preferably the larger because of being hard to evaporate, while the smaller is preferable with respect to moisture permeability and compatibility with cellulose ester.

Carboxylic acid utilized in polyhydric alcohol may be either one type or a mixture of two or more types. Further, OH groups in polyhydric alcohol may be all esterified or may partly remain as an OH group.

In the following, specific examples of polyhydric alcohol will be exemplified.

1

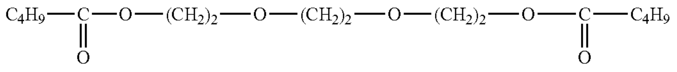

2

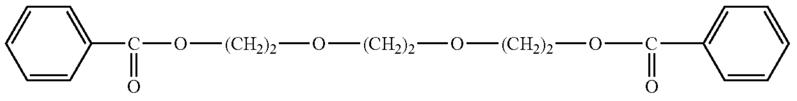

3

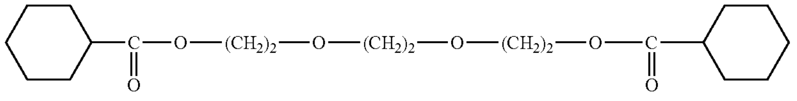

4

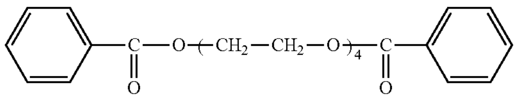

5

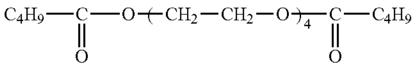

-continued
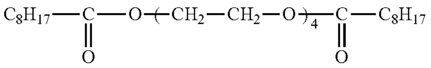
6
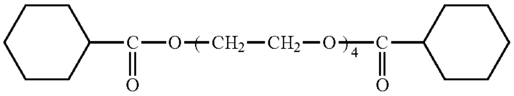
7
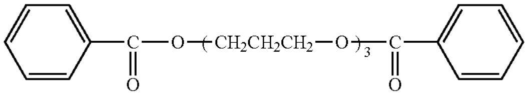
8
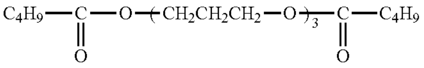
9
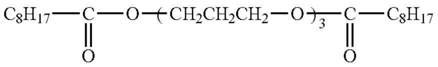
10
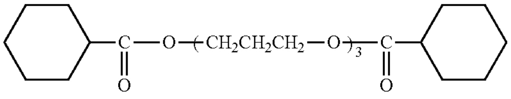
11
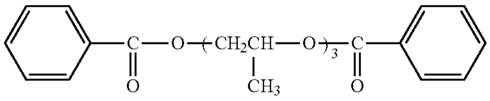
12
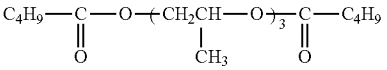
13
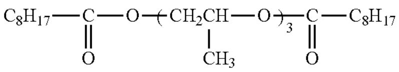
14
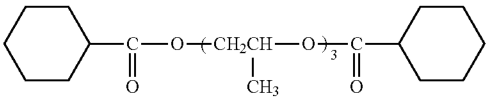
15
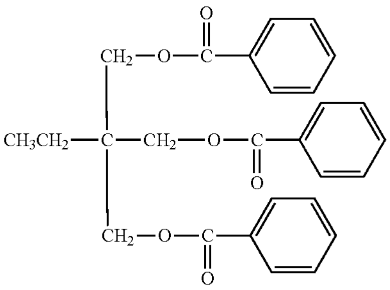
16
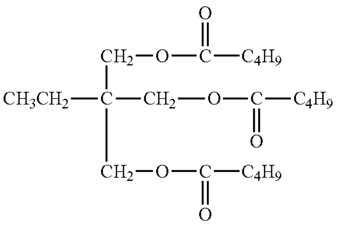
17
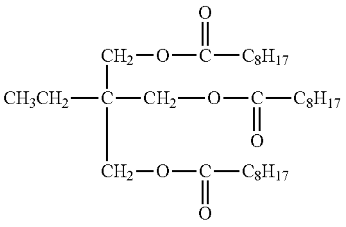
18
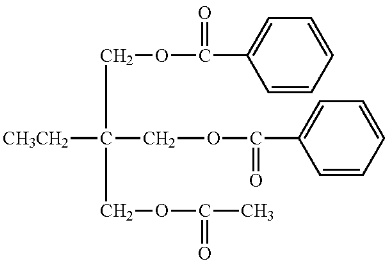
19
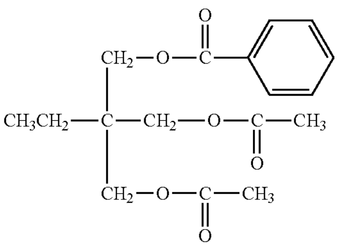
20
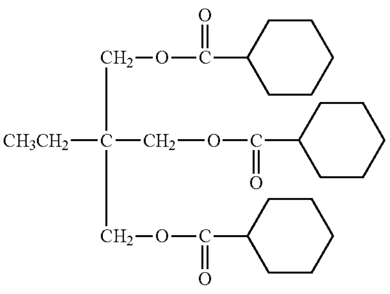
21

-continued
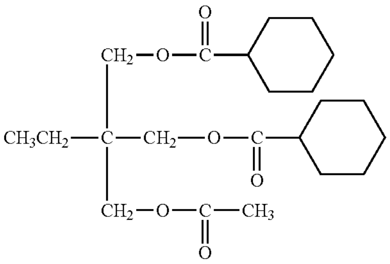
22
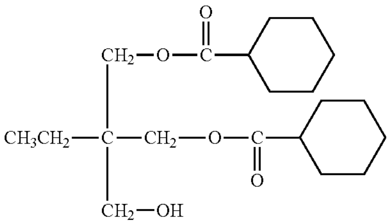
23
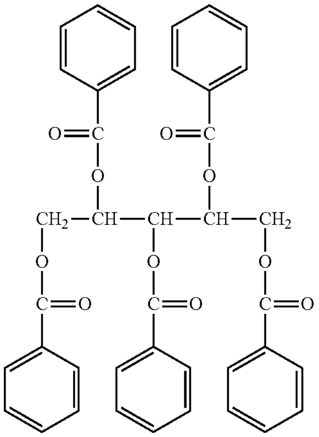
24
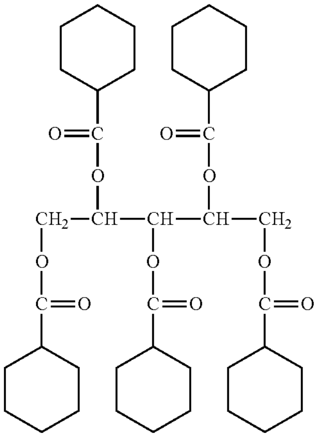
25
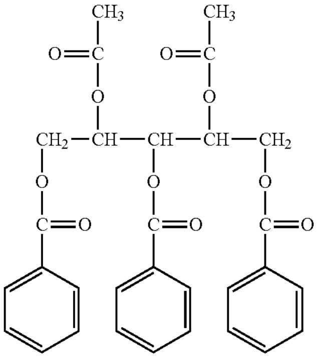
26
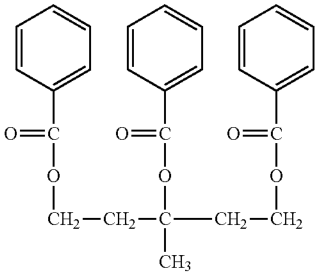
27
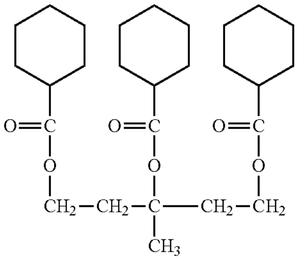
28
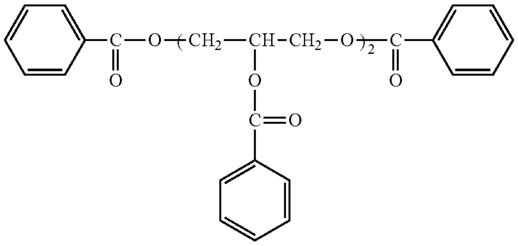
29
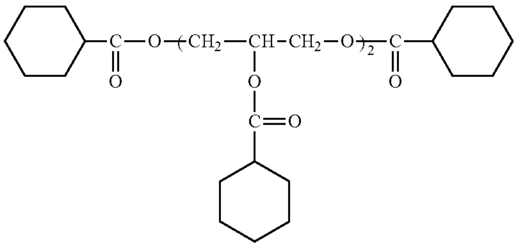
30
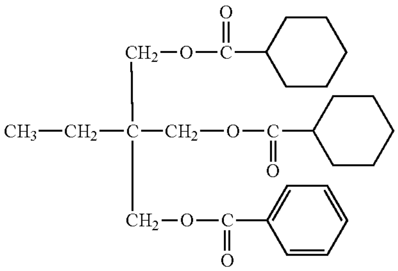
31

-continued

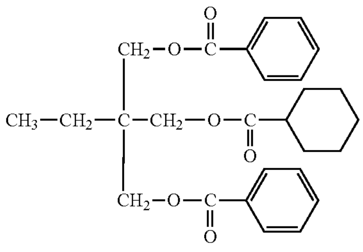

32

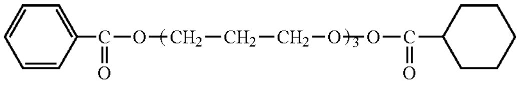

33

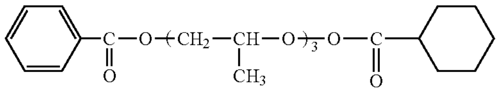

34

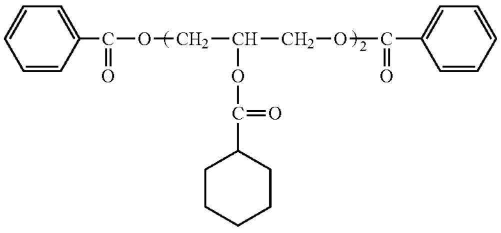

35

A glycolate type plasticizer is not specifically limited, however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylirrethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalic acid ester type plasticizer includes such as diethyl phthalate, dimethoxyethyl phthalate, dimethyl phthalate, dioctyl phthalate, dibutyl phthalate, di-2-ethylhexyl phthalate, dicyclohexyl phthalate and dicyclohexyl terephthalate.

A citric acid ester type plasticizer includes such as acetyltrimethyl citrate, acetyltriethyl citrate and acetyltributyl ciliate.

A fatty acid ester type plasticizer includes such as butyl oleate, methylacetyl ricinoleate and dibutyl sebacate.

A phosphoric acid ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic acid ester compound is comprised of ester of polycarboxylic acid of not less than 2 valent, preferably of 2 to 20 valent, and alcohol. Further, aliphatic polycarboxylic acid is preferably of 2 to 20 valent. In the case of aromatic polycarboxylic acid and alicyclic polycarboxylic acid, 3 to 20 valent are preferable.

Polycarboxylic acid is represented by following Formula (b).

$$R^2(COOH)_m(OH) \qquad \text{Formula (b)}$$

(wherein, $R^2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the followings, however, this invention is not limited thereto. Aromatic polycarboxylic acid of not less than 3 valent such as trimellitic acid, trimesic acid and pyromellitic acid, and derivatives thereof, aliphatic polycarboxylic acid such as succinic acid, adipic acid, azelaic acid, sebacic acid, oxalic acid, fumaric acid, maleic acid and tetrahydrophthalic acid; oxypolycarboxylic acid such as tartaric acid, tartronic acid, malic acid and citric acid; can be preferably utilized. It is specifically preferable to utilize oxypolycarboxylic acid with respect to such as improvement of storage stability.

Alcohol utilized in a polycarboxylic ester compound, which can be utilized in this invention, is not specifically limited and conventionally known alcohols and phenols can be utilized. For example, straight chain or branched aliphatic saturated alcohol or aliphatic unsaturated alcohol, having a carbon number of 1 to 32, can be preferably utilized. The carbon number is more preferably 1 to 20 and specifically preferably 1 to 10. Further, such as alicyclic alcohol such as cyclopentanol and cyclohexanol or derivatives thereof; and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, this invention is not limited thereto.

As aliphatic monocarboxylic acid, straight chain or branched fatty acid having a carbon number of 1 to 32 is preferably utilized. The carbon number is more preferably 1 to 20 and specifically preferably 1 to 10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthalene carboxylic acid and tetralin carboxylic acid, or derivatives thereof. Acetic acid, propionic acid and benzoic acid are specifically preferable.

The molecular weight of a monocarboxylic ester compound is not specifically limited, however, is preferably in a range of 300 to 1,000 and more preferably in a range of 350 to 750. The molecular weight is preferably the larger with respect to storage stability, while it is preferably smaller with respect to moisture permeability and compatibility with cellulose ester.

Alcohols, which are utilized in polycarboxylic ester applicable in this invention, may be either one type or a mixture of at least two types.

An acid value of a polycarboxylic ester compound utilizable in this invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured according to JIS K0070.

Specifically preferable examples of a polycarboxylic ester compound will be shown below, however, this invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plasticizer is not specifically limited, however, a polyester type plasticizer having an aromatic ring or a cycloalkyl ring in a molecule can be utilized. A polyester type plasticizer is not specifically limited, however, such as an aromatic terminal ester type plasticizer represented by following Formula (c) can be utilized.

$$B\text{-}(G\text{-}A)_n\text{-}G\text{-}B \qquad \text{Formula (c)}$$

(wherein, B is a benzene monocarboxylic acid residual group; G is an alkylene glycol residual group having a carbon number of 2 to 12, an aryl glycol residual group having a carbon number of 6 to 12, or an oxyalkylene glycol residual group having a carbon number of 4 to 12; A is an alkylene dicarboxylic acid residual group having a carbon number of 4 to 12 or an aryl dicarboxylic acid residual group having a carbon number of 6 to 12; and n is an integer of not less than 1.)

A compound represented by Formula (c) is comprised of benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester type plasticizer.

A benzene monocarboxylic acid component of polyester type plasticizer utilized in this invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2 to 12, which can be utilized in this invention, includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol; and these glycols are utilized alone or as a mixture of at least two types. An alkylene glycol having a carbon number of 2 to 12 is specifically preferable because of excellent compatibility with cellulose ester.

Further, an oxyalkylene glycol component having a carbon number of 4 to 12, of the above-described aromatic terminal ester includes such as diethylene glycol, methylene glycol, tetraethylene glycol, dipropylene glycol and tripropylene glycol; and these glycols can be utilized alone or as a mixture of two or more types.

An alkylene dicarboxylic acid component, having a carbon number of 4 to 12, of aromatic terminal ester includes such as maleic acid, fumaric acid, glutaric acid, adipic acid, azelaic acid, sebacic acid and dodecane dicarboxylic acid; and these may be utilized alone or as a mixture of not less than two types. An arylene dicarboxylic acid component having a carbon number of 6 to 12 is phthalic acid, terephthalic acid, isophthalic acid, 1,5-naphthalene dicarboxylic acid and 1,4-naphthalene dicarboxylic acid.

A polyester type plasticizer utilized in this invention preferably has a number average molecular weight in a range of 300 to 1,500 and more preferably of 400 to 1,000. Further, an acid value thereof is not more than 0.5 mg KOH/g and a hydroxyl group value of not more than 25 mg KOH/g; and more preferably the acid value is not more than 0.3 mg KOH/g and the hydroxyl pinup value of not more than 15 mg KOH/g.

In the following, synthesis examples of an aromatic terminal ester type plasticizer utilizable in this invention will be shown.

<Sample No. 1 (Aromatic Terminal Ester Sample)>

Phthalic acid of 410 parts, 610 parts of benzoic acid, 737 parts of dipropylene glycol and 0.40 parts of tetraisopropyl titanate as a catalyst were charged together in a reaction vessel which was attached with a reflux condenser, and the system was kept heated at 130 to 250° C. to continuously remove the generated water while excess monohydric alcohol was reamed with stirring in nitrogen gas flow. Next, the distillate was removed at 200 to 230° C. under a reduced pressure of not higher than $1.33\times10^4$ Pa and finally of not higher than $4\times10^2$ Pa followed by being filtered to prepare an aromatic terminal ester type plasticizer having the following characteristics.

Viscosity (25° C., mPa·s); 43,400

Acid value; 0.2

<Sample No. 2 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 341 parts of ethylene glycol and 0.35 puts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.

Viscosity (25° C., mPa·s); 38,000

<Sample No. 4 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.

Viscosity (25° C., mPa·s); 37,000

Acid value; 0.05

In the following, specific examples of an aromatic terminal ester type plasticizer utilizable in this invention will be shown; however, this invention is not limited thereto.

(1)

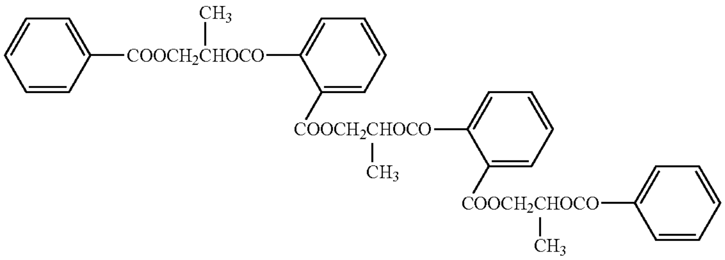

Mw: 696

(2)

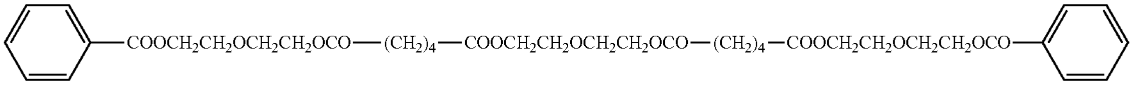

Mw: 746

(3)

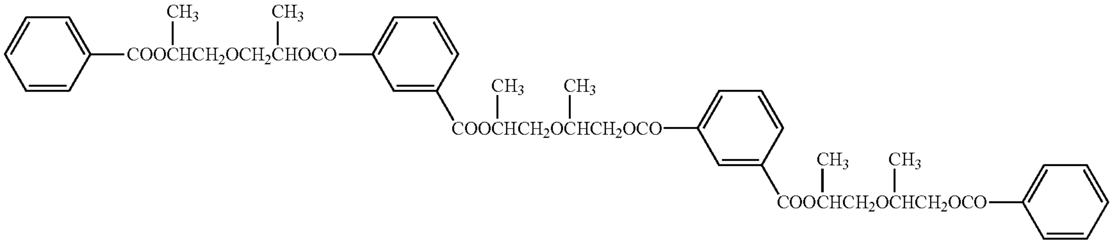

Mw: 830

(4)

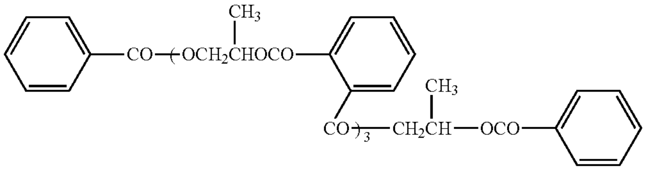

Mw: 886

(5)

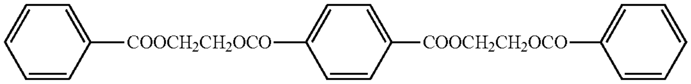

Mw: 462

(6)

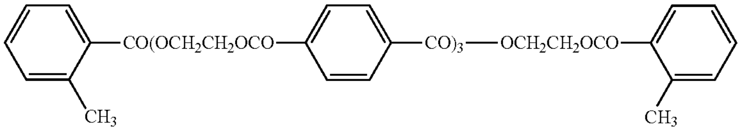

Mw: 874

(7)

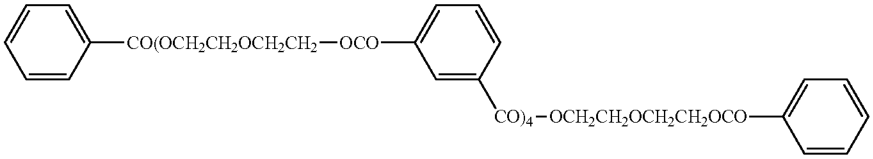

Mw: 1258

-continued (8)

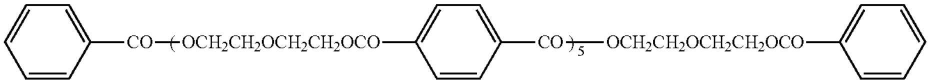

Mw: 1494

(9)

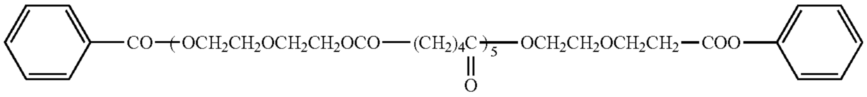

Mw: 1394

(10)

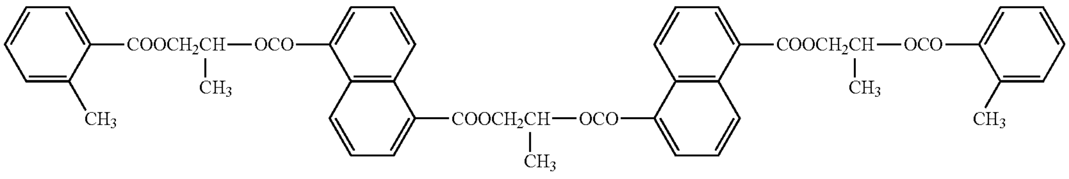

Mw: 852

(11)

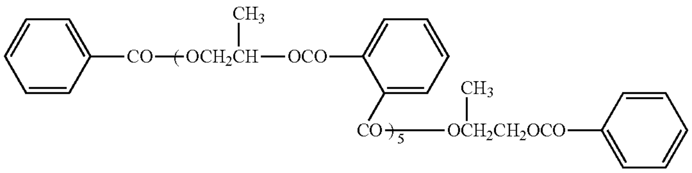

Mw: 1314

(12)

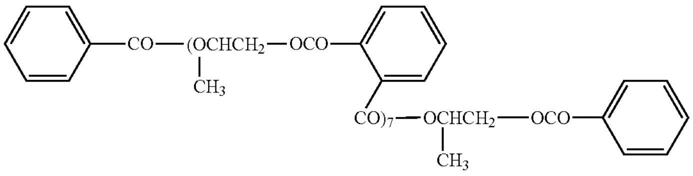

Mw: 1726

(13)

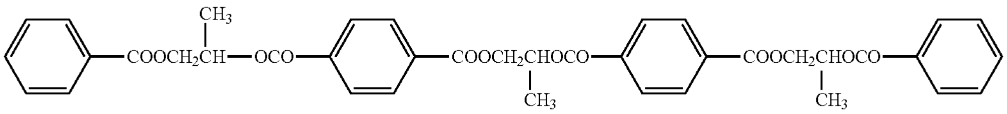

Mw: 696

Protective film according to this invention may also contain an ultraviolet absorber. An ultraviolet absorber has an object to improve durability by absorbing ultraviolet rays of not longer than 400 nm, and in particular, transmittance at a wavelength of 370 nm is preferably not more than 10%, more preferably not more than 5% and still more preferably not more than 2%.

An ultraviolet absorber utilized in this invention is not specifically limited, however, includes such as an oxybenzophenone type compound, a benzotriazole type compound, a salicylic ester type compound, a benzophenone type compound, a cyano acrylate type compound, a triazine type compound, a nickel complex salt type compound and inorganic powder.

For example listed are 5-chloro-2-(3,5-di-sec-butyl-2-hydroxyphenyl)-2H-benzotriazole, (2-2H-benzotriazole-2-yl)-6-(straight chain and branched dodecyl)-1-methylphenol, 2-hydroxy-4-benzyloxybenzophenone and 2,4-benzyloxybenzophenone; and also listed and preferably utilized are TINUVIN, such as TINUVIN 109, TINUVIN 171, TINUVIN 234, TINUVIN 326, TINUVIN 327 and TINUVIN 328, which are available on the market from Ciba Specialty Chemicals.

Ultraviolet absorbers utilized in this invention are preferably a benzotriazole type ultraviolet absorber, a benzophenone type ultraviolet absorber and a triazine type ultraviolet absorber, and specifically preferably a benzotriazole type ultraviolet absorber and a benzophenone type ultraviolet absorber.

For example, as a benzotriazole type ultraviolet absorber, a compound represented by following Formula (d) can be utilized.

Formula (d)

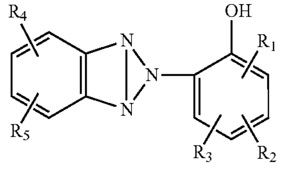

In the formula, $R_1$, $R_2$, $R_3$, $R_4$ and $R_5$, which may be same or different, are a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, mono- or di-alkylamino group, an acylamino group or a 5 to 6 member heterocyclic group; and $R_4$ and $R_5$ may perform ring closure to form a 5 to 6 member carbon ring.

Further, these groups described above may be provided with a substituent.

In the following, specific examples of a benzotriazole type ultraviolet absorber utilized in this invention will be listed.

UV-1: 2-(2'-hydroxy-5'-methylphenyl)benzotriazole
UV-2: 2-(2'-hydroxy-3',5'-di-tert-butylphenyl)benzotriazole
UV-3: 2-(2'-hydroxy-3'-tert-5'-methylphenyl)benzotriazole
UV-4: 2-(2'-hydroxy-3',5'-di-tert-butylphenyl)-chlorobenzotriazole
UV-5: 2-(2'-hydroxy-3'-(3",4",5",6"-tetrahydrophthalimidomethyl)-5'-methyl phenyl)-benzotriazole
UV-6: 2,2-methylenebis-(4-(1,1,3,3-tetramethylbutyl)-6-(2H-benzotriazole-2-yl)phenol)
UV-7: 2-(2'-hydroxy-3'-di-tert-butyl-5'-methylphenyl)-5-chlorobenzotriazole
UV-8: 2-(2H-benzotriazole-2-yl)-6-(straight chain and branched dodecyl) methylphenol (Tinuvin 171)
UV-9: A mixture of octyl-3-[3-tort-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (Tinuvin 109)

Further, a compound represented by following Formula (e) is preferably utilized as a benzophenone type ultraviolet absorber.

Formula (e)

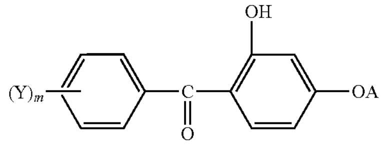

In the formula Y is a hydrogen atom, a halogen atom, an alkyl group, an alkenyl group, an alkoxy group and a phenyl group; and these alkyl group, alkenyl group and phenyl group may have a substituent. A is a hydrogen atom, an alkyl group, an alkenyl group, a phenyl group, a cycloalkyl group, an alkylcarbonyl group, an alkylsulfonyl group or —CO$(NH)_{n-1}$-D group; and D is an alkyl group, an alkenyl group or a phenyl group which may have a substituent m and n are 1 or 2.

In the above description, an alkyl group is, for example, a straight chain or branched aliphatic group having a carbon number of up to 24; an alkoxy group is, for example, an alkoxy group having a carbon number of up to 18; and an alkenyl group is, for example, an alkenyl group having a carbon number of up to 16 such as an allyl group and a 2-butenyl group. Further, a substituent to an alkyl group, an alkenyl group and a phenyl group includes such as a halogen atom (such as a chlorine atom, a bromine atom and a fluorine atom), a hydroxyl group and a phenyl group (this phenyl group may be substituted by such as an alkyl group or a halogen atom).

In the following, specific examples of a benzophenone type ultraviolet absorber represented by Formula (e).

UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenyl-methane)

In addition to these, a disc form compound such as a compound having a 1,3,5-triazine ring is preferably utilized as an ultraviolet absorber.

Polarizing plate protective film according to this invention preferably contains more than two types of ultraviolet absorbers.

Further, a polymer ultraviolet absorber may also be preferably utilized as an ultraviolet absorber, and polymer type ultraviolet absorbers described in JP-A H06-148430 are specifically preferably utilized.

As a method adding an ultraviolet absorber, an ultraviolet absorber may be added into a dope after having been dissolved in an organic solvent such as alcohol like methanol, ethanol and butanol, methylene chloride, methyl acetate, acetone and dioxane; or may be directly added into a dope composition. Those insoluble in an organic solvent, such as inorganic powder, will be added into a dope after having been dispersed in an organic solvent and cellulose ester by use of such as a dissolver or a sand mill.

The using amount of an ultraviolet absorber is not uniform depending on a type and a using condition of an ultraviolet absorber, however, in the case of the dry layer thickness of polarizing plate protective film of 30 to 200 μm, it is preferably 0.5 to 10 potent by weight and more preferably 0.6 to 4 potent by weight; for a polarizing plate protective film.

(Micro-Particles)

Polarizing plate protective film according to this invention preferably contains micro-particles.

As inorganic micro-particles utilized in this invention, examples of an inorganic compound include silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate. Micro-particles are preferably those containing silicon because turbidity is decreased, and silicon dioxide is specifically preferred.

An average particle diameter of a primary particle of micro-particles is preferably 5 to 400 nm and more preferably 10 to 300 nm. These may be contained as secondary aggregate having a particle size of 0.05 to 0.3 μm, or may be contained as primary particles without aggregation in the case of particles having an average particle size of 100 to 400 nm. The content of these micro-particles in polarizing plate protective film is preferably 0.01 to 1 percent by weight and specifically preferably 0.05 to 0.5 percent by weight. In the case of a polarizing plate protective film comprising a constitution of plural layers by a co-casting method, micro-particles of this addition amount are preferably incorporated in the surface.

As micro-particles of silicon dioxide, for example, products under the names of AEROSIL R972, R972V, R974, R812, 200, 200V, 300, R202, OX50 and TT600 (produced by Nippon Aerosil Co., Ltd.) are available on the market and can be utilized.

As micro-particles of zirconium oxide, for example, products under the names of Aerosil R976 and R811 (produced by Nippon Aerosil Co., Ltd.) are available on the market and can be utilized.

Examples of polymer include silicone resin, fluorine-containing resin and acrylic resin. Silicone resin is preferred and those, having a three dimensional net structure, are specifically preferable; for example, products under the name of TOSPEARL 103, 105, 108, 120, 145, 3120 and 240 (produced by Toshiba Silicones Co., Ltd.) are available on the market and can be utilized.

Among these, AEROSIL 200V and AEROSIL R972 are specifically preferably utilized because of a large effect to decrease a friction coefficient while keeping turbidity of polarizing plate protective film to be low. In polarizing plate protective film utilized in this invention, a dynamic friction coefficient of at least one of the surfaces is preferably 0.2 to 1.0.

Various types of additives may be batch-wise added into a dope as a cellulose ester containing solution before casting or may be inline-wise added by preparing a solution of dissolved additives. In particular, a part of or the total amount of micro-particles are preferably added by an inline method to reduce a load on a filter medium.

In the case of addition of an additive solution is performed by an inline method, it is preferable to dissolve a small amount of cellulose ester in the solution to increase compatibility with a dope. The preferable amount of cellulose ester is 1 to 10 weight parts and more preferably 3 to 5 weight parts based on 100 parts of a solvent.

To perform inline addition and mixing in this invention, for example, an inline mixer such as Static Mixer (manufacturer by Toray Engineering Corp.) and SWJ (Toray Static Inline Mixer, Hi-Mixer) is preferably utilized.

(Manufacturing Process of the Optical Compensation Film)

Manufacturing process of the optical compensation film of this invention will be described.

Film manufactured by solution cast method or melt cast method may be preferably used for the optical compensation film of this invention.

The optical compensation film of this invention is manufactured by a process of preparing dope in which cellulose ester and additives are dissolved in a solvent, a process of casting the dope on running endless metal support, a process of drying the cast dope as a web, a process of separating from the metal support, a process of expand or maintaining the width, a process of drying further, and a process of winding the finished film.

A process to prepare a dope will be now described. The concentration of cellulose in a dope is preferably the higher with respect to decreasing a drying load after the dope has been cast on a metal support, while, when the concentration of cellulose ester is excessively high, filtering precision will be deteriorated due to an increased load at the time of filtering. The concentration to balance these is preferably 10 to 35 percent by weight and more preferably 15 to 25 percent by weight.

A solvent utilized in a dope of this invention, one type alone or at least two types in combination may be utilized, however, a good solvent and a poor solvent of cellulose ester are preferably utilized in combination with respect to manufacturing efficiency. A preferable range of a mixing ratio of a good solvent to a poor solvent is 70 to 98 percent by weight of good solvent to 2 to 30 percent by weight of a poor solvent. As a good solvent and a poor solvent, one dissolves cellulose ester, which is utilized, by itself alone is defined as a good solvent and one swells or can not dissolve cellulose ester is defined as a poor solvent. Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate, while it becomes a poor solvent for acetic ester of cellulose (an acetyl substitution degree of 2.8) of cellulose.

A good solvent utilized in this invention is not specifically limited, however, includes an organic halogen compound such as methylene chloride, dioxolan, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope preferably contains 0.01 to 2 percent by weight of water. Further, as a solvent utilized for dissolution of cellulose ester, a solvent removed from film by drying in a film casting process is recovered and reused, after purified if necessary.

As a dissolution method of cellulose ester at the time of preparation of the dope described above, a general method can be employed. By combination of heating and increased pressure, it is possible to heat up to higher than a boiling point at an ordinary pressure. It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high. The heating temperature is preferably 45 to 120° C., more preferably 60 to 110° C. and still more preferably 70 to 105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small. Therefore, the absolute filtering precision of a filter medium is preferably not larger than 0.008 mm, more preferably 0.001 to 0.008 mm and furthermore preferably 0.003 to 0.006 mm. The material of a filter medium is not specifically limited and an ordinary filter medium can be utilized, however, a filter medium made of plastic such as polypropylene and TEFLON® and a filter medium made of metal such as stainless steel are preferable because of such as no release of fiber of a filter medium.

It is preferable to eliminate and reduce impurities, particularly foreign materials causing a bright spot defect having been contained in cellulose ester as a raw material by filtration.

Foreign materials causing bright spot defects means a spot (a foreign material) which is visible due to light leak, when two sheets of polarizing plates, between which polarizing plate protective film is placed, are arranged in a crossed Nicols state, and light is irradiated from one of the polarizing plate side to be observed from the other polarizing plate side. The number of bright spots having a diameter of not less than 0.01 mm is preferably not more than 200 spots/$cm^2$. More preferably not more than 100 spots/not more than 200 spots/$cm^2$, furthermore preferably not more than 50 spots/$cm^2$ and most preferably 0 to 10 sport/$cm^2$. Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures before and after filtering (referred to as a pressure difference). The preferable temperature is 45 to 120° C., more preferably 45 to 70° C. and furthermore preferably 45 to 55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is mirror finished, is utilized. The cast width can be set to 1 to 4 m. The surface temperature of a metal support in a cast process is from −50° C. to lower than a boiling point of a solvent and it is preferable the temperature is the higher since web drying speed is fast; however, excessively high temperature may sometimes cause foaming of a web or deterioration of flatness. The support temperature is preferably 0 to 40° C. and more preferably 5 to 30° C. It is also a preferable method to make a web gelled by cooling and to peel off the web from a dram with a plenty of residual solvent contained. A method to control the temperature of a metal support is not specifically limited, however, there are a method to blow a hot wind or a cold wind on the web and a method to make hot water contact the rear side of a metal support. A method to utilize hot water is preferable because time required to make a metal support become a constant temperature is short due to more efficient heat transfer by use of a hot water. In the case of employing a hot wind, a wind of a temperature higher than the aimed temperature may be employed.

To provide a good flatness of polarizing plate protective film, the residual solvent amount at the time of peeling off a web from a metal support is preferably 10 to 150 percent by weight, more preferably 20 to 40 potent by weight or 60 to 130 percent by weight and specifically preferably 20 to 30 portent by weight or 70 to 120 percent by weight.

A residual solvent amount is defined by the following formula in this invention.

Residual solvent amount (percent by weight)=$\{(M-N)/N\}\times100$

Herein, M is a weight of a sample picked at an arbitrary time during or after manufacturing of a web or film and N is a weight after heating at 115° C. for 1 hour.

Further, in a drying process of polarizing plate protective film, a web is preferably peeled off from a metal support and further dried to make a residual solvent amount of not more than 1 percent by weight, more preferably not more than 0.1 percent by weight and specifically preferably 0 to 0.01 percent by weight.

In a film drying process, a roll drying method (in which a web is dried while being alternately passed through many rolls which are arranged up and down) or a method to dry a web while being transported by a tenter method will be applied.

It is specifically preferable that a web is stretched in the width direction by means of a tenter method to grip the both edges of the web by such as clips to prepare optical compensation film of this invention. It is preferable to peel offal a peel-off tension of not less than 300 N/m.

A means to dry a web is not specifically limited, and it can be generally performed by such as a hot wind, infrared rays, a heat roll and microwaves, however, preferably performed by a hot wind with respect to convenience.

Drying temperature in a drying process of a web is preferably 40 to 200° C. and stepwise raised. The layer thickness of optical compensation film is not specifically limited; however, a layer thickness of 10 to 200 μm is applied. The layer thickness is specifically preferably 10-100 μm and furthermore preferably 20 to 60 μm.

Optical compensation film of this invention has a width of 1 to 4 m. The width is preferably 1.4 to 4 m and specifically preferably 1.6 to 3 m. When the width exceeds 4 m, the transportation becomes difficult.

(Stretching Operation, Refractive Index Control)

The optical compensation film preferably has retardation values Ro and Rt which satisfy the following Formulas (i) to (iii).

$$20\leq Ro\leq100\ (\text{nm}) \quad (i)$$

$$70\leq Rt\leq200\ (\text{nm}) \quad (ii)$$

$$0.82\leq Ro(480)/Ro(630)\leq0.96 \quad (iii)$$

Here, $$Ro=(nx-ny)\times d$$

$$Rt=((nx+ny)/2-nz)\times d$$

(In these formulas, nx represents a refractive index in the retarded phase axis direction in a plane of the optical compensation film, ny represents a refractive index in a direction perpendicular to the retarded phase axis direction in a plane, nz represents a refractive index in a thickness direction and d represents the thickness (nm) of the optical compensation film respectively. The measuring wavelength for the refractive index is 590 nm. Ro (480) and Ro (630) represent Ro measured with the wavelength of 480 nm and Ro measured with the wavelength of 630 nm, respectively).

The above-described refractive index can be determined by the use of for example, KOBRA-21ADH (manufactured by Oji Instrument Co., Ltd.) at a wavelength of 590 nm under an environment of 23° C. and 55% RH.

Wave length dispersion property as well as retardation can be adjusted as desired by adding the Polymer (a) and the compound having furanose structure or pyranose structure of this invention in optional combination.

In the present invention, even if the phase differences are 20≤Ro≤100 (nm) and 70≤Rt≤200 (nm), the wavelength dispersion characteristic of 0.82≤Ro(480)/Ro(630)≤0.95 can be attained.

The desirable range in the present invention is 20≤Ro≤100 (nm), and is especially preferably 45≤Ro≤75 (nm).

The desirable range in the present invention is 70≤Rt≤200 (nm), and is especially preferably 105≤Rt>140 (nm).

To achieve retardation values Ro and Rt which are described above, it is preferable that optical compensation film employs a constitution of this invention and refractive index control is further performed by a stretching operation.

For example, it is possible to perform successive or simultaneous stretching in the longitudinal direction of film (the cast direction) and in the direction perpendicular thereto, that is, in the width direction.

The stretching magnifications in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., more preferably 160° C. to 200° C., still more preferably higher than 170° C. and not higher than 200° C. It may be preferable to stretch a film under the condition where the content of the residual solvent in the film is 20 to 0%, more preferably 15 to 0%. More concretely, the film is preferably stretched under the condition that the content of the residual solvent is 11% at 155° C., or the content of the residual solvent is 2% at 155° C. Otherwise, the content of the residual solvent is 11% at 165° C., or the content of the residual solvent is not higher than 1% at 165° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to sketch by widening similarly along the width direction, or a method to stretch in the both of longitudinal and width directions by simultaneously widening along the longitudinal and width directions. Of cause, these methods can be utilized in combination. In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The retardation axis or the advanced axis of optical compensation film of this invention preferably is present in a film plane and θ1 is preferably not less than −1° and not more than +1°, and more preferably not less than −0.5° and not more than +0.5°, when the angle against the casting direction is θ1. This θ1 can be defined as an orientation angle, and measurement of θ1 can be performed by use of automatic birefringence meter KOBRA-21ADH (Oji Scientific Instruments). To satisfy the above-described relationships by θ1 can contributes to obtain a high luminance and to restrain or prevent light leak and to obtain good fidelity color reproduction in a color liquid display.

(Physical Properties)

Moisture permeability of optical compensation film according to this invention is preferably 10 to 1,200 $g/m^2 \cdot 24$ h, more preferably 20 to 1,000 $g/m^2 \cdot 24$ h and specifically preferably 20 to 850 $g/m^2 \cdot 24$ h at 40° C., 90% RH. Moisture permeability can be measured according to a method described in JIS Z 0208.

Elongation percentage of the optical compensation film according to this invention is preferably 10 to 80% and more preferably 20 to 50%.

Visible light transmittance of optical compensation film according to this invention is preferably not less than 90% and more preferably not less than 93%.

Haze of optical compensation film according to this invention is preferably less than 1% and specifically preferably 0 to 0.1%.

Further, if a liquid crystal layer is coated on the optical compensation film of the present invention, retardation values extending over a more wide range may be obtained.

(Polarizing Plate)

A polarizing plate and a liquid crystal display device using it according to this invention will be now explained.

A polarizing plate of this invention is characterized by being a polarizing plate constituted of a polarizer, adhered with the aforesaid optical compensation film of this invention as a polarizing protective film on at least one surface. A liquid crystal display device of this invention is characterized in that a polarizing plate according to this invention is adhered up on at least one liquid crystal cell surface via an adhesive layer.

A polarizing plate of this invention can be prepared by an ordinary method. The optical compensation film of this invention, the polarizer side of which is subjected to an alkaline saponification treatment, is preferably adhered up on at least one surface of a polarizer which has been prepared by immersion stretching in an iodine solution by use of a completely saponificated type polyvinyl alcohol aqueous solution. On the other surface, said optical compensation film may be utilized or another polarizing plate protective film may be utilized. Cellulose ester film (such as Konica Minolta TAC KC8UX, KC4UX, KC5LJX, KC8UCR3, KC8UCR4, KC8UCR5, KC8UY, KC4UY, KC12UR, KC4UE, KC8UE, KC8UY-11A, KC8UX-RHA, KC8UXW-RHA-C. KC8UXW-RHA-NC, and KC4UXW-RHA-NC manufactured by Konica Minolta Opto. Inc.) available on the market is also preferably utilized.

Onto the polarizing plate protective film used for the surface side of a display unit, it is desirable to provide an antireflection layer, an antistatic layer, an antifouling layer, and a back coat layer in addition to an antiglare layer or a clear hard coat layer.

A polarizer as a primary composing element of the polarizing plate is an element to pass light of a polarized wave plane of a predetermined direction, and a typical polarizer known at present is polyvinyl type polarizing film, which includes polyvinyl alcohol film dyed with iodine and one dyed with dichroic dye. As a polarizer, utilized is one in which a polyvinyl alcohol aqueous solution is made to film, and the obtained film is uniaxially stretched and dyed, or is uniaxially stretched after having been dyed, preferably followed by being subjected to a durability treatment with a boron compound. The layer thickness of a polarizer is preferably 5 to 30 μM and specifically preferably 10 to 20 μm.

Further, ethylene modified polyvinyl alcohol which is described in such as JP-A 2003-248123 and JP-A 2003-342322 and has an ethylene unit content of 1 to 4 mol % a polymerization degree of 2,000 to 4,000 and a saponification degree of 99.0 to 99.99 mol % is also preferably utilized. Among them, ethylene modified polyvinyl alcohol having a hot water breaking temperature of 66 to 73° C. is preferably utilized. Further, a difference of hot water breaking temperature between two points remote from each other by 5 cm in the film TD direction is preferably not more than 1° C. and more preferably not more than 0.5° C., in order to reduce color spottiness.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is adhered up, is utilized as a polarizing plate. An adhesive employed at the time of paste up includes a PVA type adhesive and an urethane type adhesive, however, among them preferably utilized is a PVA type adhesive.

(Liquid Crystal Display)

By using the polarizing plate according to the third embodiment of the present invention for a liquid crystal display, various kinds of the liquid crystal displays of the present invention excellent in visibility can be produced. The optical compensation film of the present invention can be used for liquid crystal displays with various drive systems such as STN, TN, OCB, HAN, VA (MVA, PVA), IPS, and OCB. It is desirable to use for a VA (MVA, PVA) type liquid crystal display. Especially, even if a liquid crystal display has a large screen more than 30 type, it is possible to obtain a liquid crystal display in which there are few environmental variations, light leakage is reduced, and visibility, such as color tone unevenness and front contrast is excellent Especially, the frequency of occurrence of light leakage can be reduced by the group of the liquid crystal display manufactured by the use of the optical compensation film of the present invention.

EXAMPLE

The invention is concretely illustrated by means of Examples, to which this invention is not limited.

Example 1

Cellulose ester, Polymer (a), a compound having a furanose or pyranose structure (Compound (b), sugar ester compound), plasticizers, and UV absorber used in the Examples are listed in Table 1.

TABLE 1

| Cellulose Ester | Substitution Degree of Acyl group | | Total substitution degree of acyl group |
|---|---|---|---|
| A | Acetyl group: 1.9 | Propionyl group: 0.8 | 2.7 |
| B | Acetyl group: 1.6 | Propionyl group: 0.9 | 2.5 |
| C | Acetyl group: 1.1 | Propionyl group: 0.9 | 2.0 |
| D | Acetyl group: 1.2 | Propionyl group: 1.1 | 2.3 |
| E | Acetyl group: 2.4 | | 2.4 |
| F | Acetyl group: 1.3 | Propionyl group: 1.2 | 2.5 |

| Sugar Ester Compound | |
|---|---|
| A | Exemplified Compound 3 |
| B | Exemplified Compound 5 |
| C | Mixture of the same weight of Exemplified Compounds 6 and 7 |
| D | Exemplified Compound 8 |

| Plasticizer | |
|---|---|
| A | Triphenyl phosphate |
| B | Ethylphthalyl ethylglycolate |
| C | Trimethylol propanetribenzoate |

TABLE 1-continued

| UV Absorber | | |
|---|---|---|
| A | TINUVIN 326 | Ciba Specialty Chemicals |
| B | TINUVIN 109 | Ciba Specialty Chemicals |
| C | TINUVIN 171 | Ciba Specialty Chemicals |

Polymer (a) used in the Example is described below.

Synthesis Example 1

Copolymer AMP-6 of exemplified compound AM-2 and methylmethacrylate was synthesized in accordance the following method.

Hundred and twenty five gams of polymer raw material composed of 100 parts by weight of monomer mixture of 20% by weight of exemplified compound AM-2 and 80% by weight of methylmethacrylate to which 2.0 parts by weight of peroxy lauroyl, 0.25 parts by weight of n-octylmercaptan and 0.1 parts by weight of stearic alcohol were added, and 250 g of deionized water dissolving preliminarily 0.2 g of 1% aqueous solution of sodium polymethacrylate, 0.05 g of sodium dihydrogen phosphate and 0.15 g of disodium hydrogen phosphate were charged in a flask having stirrer, air was substituted with nitrogen, polymerization was carried out at 70° C. for 3 hours, and then polymerization was further carried out at 100° C. for 1 hour. Bead form of copolymer AMP-6 was obtained through cooling filtration, washing and drying processes after completion of polymerization. The copolymer was confirmed to have an weight average molecular weight of 12,000 and Mw/Mn of 2.8 by GPC analysis employing standard polystyrene.

Thus obtained copolymer was confirmed as a copolymer of the exemplified compound AM-2 and methylmethacrylate by NMR spectrum. Composition content of AM-2/methylmethacrylate was approximately 20/80.

Synthesis Example 2

Copolymer AMP-7 of exemplified compound AM-2 and methylacrylate was synthesized in accordance the following method.

Into 100 ml of toluene, 10 g of monomer mixture of 50 weight parts of AM-2 and 50 weight parts of methyl methacrylate was added, then 0.1 g of azobisisobutyronitrile was added Temperature was raised up to 80° C. and polymerization was carried out for 5 hours in nitrogen atmosphere. After removing 70 ml of toluene by evaporation under reduce pressure, the content was dripped far excess amount of methanol. Deposited precipitation was subjected to filtration, washing and drying processes, and powder copolymer AMP-7 was obtained. The copolymer was confirmed to have an weight average molecular weight of 30,000 and Mw/Mn of 3.0 by GPC analysis employing standard polystyrene.

Thus obtained copolymer was confirmed as a copolymer of the exemplified compound AM-2 and methylacrylate by NMR spectrum. Composition content of AM-2/methylacrylate was approximately 50/50.

Polymer (a) of AMP-1 through 5, and 8 through 20, respectively was synthesized in the similar manner. Weight average molecular weight and composition content of synthesized polymers was each measured in the same way as Synthesize Example 1. Details of polymers are shown in Table 2.

TABLE 2

| Polymer (a) | Monomer Component Content | | | | Weight average molecular weight |
|---|---|---|---|---|---|
| AMP 1 | AM-1 | 20 | MMA | 80 | 22,000 |
| AMP 2 | AM-1 | 40 | MMA | 60 | 9,000 |
| AMP 3 | AM-1 | 50 | MA | 50 | 38,000 |
| AMP 4 | AM-1 | 50 | St | 50 | 14,000 |
| AMP 5 | AM-2 | 50 | VAC | 50 | 28,000 |
| AMP 6 | AM-2 | 20 | MMA | 80 | 12,000 |
| AMP 7 | AM-2 | 50 | MA | 50 | 30,000 |
| AMP 8 | AM-2 | 60 | St | 40 | 7,000 |
| AMP 9 | AM-2 | 50 | VAC | 50 | 9,000 |
| AMP 10 | AM-2 | 20 | MMA | 80 | 5,000 |
| AMP 11 | AM-2 | 30 | MMA | 70 | 8,000 |
| AMP 12 | AM-3 | 50 | HEMA | 50 | 8,000 |
| AMP 13 | AM-4 | 30 | HEMA | 70 | 38,000 |
| AMP 14 | AM-5 | 50 | MA | 50 | 21,000 |
| AMP 15 | AM-5 | 30 | HEA | 70 | 19,000 |
| AMP 16 | AM-5 | 50 | HEMA | 50 | 12,000 |
| AMP 17 | AM-6 | 20 | MMA | 80 | 30,000 |
| AMP 18 | AM-7 | 40 | MMA | 60 | 15,000 |
| AMP 19 | AM-13 | 30 | MA | 70 | 45,000 |
| AMP 20 | AM-15 | 60 | MMA | 40 | 73,000 |

In Table 2 MA, MMA, HEA, St, and VAC are abbreviation of the following compound, respectively.

MA: Methylacrylate

MMA: Methylmethacrylate

HEA: 2-Hydroxyethylmethacrylate

St: Styrene

VAC: Vinyl acetate

<Producing Optical Compensation Film 101>

<Microparticles Dispersion 1>

| | |
|---|---|
| Microparticles (AEROSIL R972V, manufactured by Nippon Aerosil Co., Ltd.) | 11 parts by weight |
| Ethanol | 89 parts by weight |

These were mixed and agitated for 50 minutes by means of dissolver and the dispersed by Manton-Gaurin.

<Liquid for in-Line Addition>

Cellulose ester B was added into a dissolution tank containing methylene chloride, and was dissolved completely by heating, then it was filtered employing AZUMI FILTER PAPER No. 211 manufactured by Azumi Filter Paper Co., Ltd.

Dispersion of microparticles was added slowly in filtered cellulose acetate solution while sufficiently agitating. Dispersion was carried out by an attritor mill so that particle diameter of secondary particles reached to predetermined size. The resultant was filtered by FINEMET NT manufactured by Nippon seisen Co. Ltd, and Liquid 1 for in-line addition was obtained.

| | |
|---|---|
| Methylene chloride | 99 parts by weight |
| Cellulose ester B | 4 parts by weight |
| Microparticles Dispersion 1 | 11 parts by weight |

Primary dope composition having the following components was prepared. Methylene chloride and ethanol were added into a pressured dissolution tank. Cellulose acetate B was poured into the pressured dissolution tank containing solvent while agitating. Polymer (a) and sugar ester compound of this invention were added and completely dissolved by heating with agitation, and was filtered by employing AZUMI FILTER PAPER No. 244, to obtain dope composition.

<Primary Dope Components>

| | |
|---|---|
| Methylene chloride | 380 parts by weight |
| Ethanol | 70 parts by weight |
| Cellulose ester B | 100 parts by weight |
| Polymer (a) of this Invention | 3.5 parts by weight |
| Sugar ester compound of this Invention | 11.5 parts by weight |

Dope composition was filtered by FINEMET NT manufactured by Nippon seisen Co. Ltd. in the film forming line. Liquid for in-line addition was filtered by Nippon seisen Co. Ltd. in the in-line liquid addition line. Two parts by weight of filtered in-line addition liquid was added to 100 parts by weight of filtered dope composition, and was mixed well by means of in-line mixer (Static type in-line mixer Hi-Mixer SWJ, manufactured by Toray), then the dope was cast on stainless steel belt support with uniformity at width of 1.8 meter at 35° C. by employing a belt casting apparatus. Solvent was evaporated so as to have solvent residue amount of 120% on the stainless belt support, then it was separated from the stainless belt support. Solvent of the separated cellulose ester web was evaporated at 50° C., and the web was slit to have 1.65 m width, and stretched to TD direction (orthogonal direction to film conveying direction) at a temperature with stretching magnification as shown in Table. Drying was completed by conveying with a plenty of rolls in a drying zone at 120° C., the web was slit to have 1.5 in width, and was subjected to a knurling process so as to have an average height of 10 μm at both side of 15 mm. Thus Optical Compensation Film 101 having an average thickness of 40 μm was manufactured. The width of the film was 1.5 m, winding length was 5,000 m.

Optical Compensation Films 102 to 134 were manufactured by the same manner except that kinds of cellulose ester, Polymer (a), sugar ester compound, plasticizer and UV absorber, and stretching magnifier and film thickness were changed as described in Tables 3 and 4. Further, comparative Optical Compensation Films to which Polymer (a) or sugar ester compound was not added were manufactured.

Retardation values for each obtained samples were measured in the following way at each wave length. The result is summarized in Tables 3 and 4.

(Measuring Retardation Ro and Rt)

Samples having size of 35 mm×350 mm was cut from obtained film, and was subjected to moisture conditioning at 25° C., 55% RH for 2 hours. The values were calculated via extrapolation method from retardation values measured in perpendicular direction and inclined direction at 480 nm, 500 nm and 630 nm by an automatic birefringence meter (KOBRA 21DH, manufactured by Oji instrument Co., Ltd)

TABLE 3

| Optical compensation film No. | Dope composition: Cellulose ester Kind | *1 | Kind | *1 | Polymer (a) Kind | *1 | Sugar ester compound Kind | *1 | Plasticizer (*) | UV Absorber (*) | Manufacture condition: Stretch magnification | Film thickness | Stretch temperature |
|---|---|---|---|---|---|---|---|---|---|---|---|---|---|
| 101 | B | 100 | — | — | AMP1 | 3.5 | A | 11.5 | — | — | 1.4 | 40 | 150 |
| 102 | B | 90 | C | 10 | AMP2 | 3.5 | B | 11.5 | — | — | 1.4 | 40 | 150 |
| 103 | B | 80 | C | 20 | AMP3 | 3.5 | C | 11.5 | — | — | 1.4 | 40 | 150 |
| 104 | B | 70 | C | 30 | AMP4 | 3.5 | D | 11.5 | — | — | 1.3 | 40 | 150 |
| 105 | B | 60 | C | 40 | AMP5 | 3.5 | A | 11.5 | — | — | 1.3 | 40 | 150 |
| 106 | B | 100 | — | — | AMP6 | 3.5 | B | 11.5 | — | — | 1.6 | 60 | 171 |
| 107 | B | 100 | — | — | AMP7 | 3.5 | C | 11.5 | — | — | 1.5 | 60 | 160 |
| 108 | B | 100 | — | — | AMP8 | 3.5 | D | 11.5 | — | — | 1.5 | 50 | 150 |
| 109 | B | 100 | — | — | AMP9 | 3.5 | B | 11.5 | B (5.3) | — | 1.2 | 40 | 140 |
| 110 | B | 90 | A | 10 | AMP10 | 5.5 | A | 5.5 | — | — | 1.4 | 40 | 155 |
| 111 | B | 80 | A | 20 | AMP11 | 5.5 | A | 5.5 | — | — | 1.4 | 40 | 160 |
| 112 | B | 70 | A | 30 | AMP12 | 5.5 | A | 5.5 | — | — | 1.4 | 40 | 165 |
| 113 | B | 60 | A | 40 | AMP13 | 5.5 | A | 5.5 | — | — | 1.4 | 40 | 170 |
| 114 | F | 100 | — | — | AMP14 | 5.5 | A | 5.5 | — | A (0.4)<br>B (0.7)<br>C (0.6) | 1.4 | 40 | 180 |
| 115 | A | 100 | — | — | AMP15 | 3.5 | A | 11.5 | — | — | 1.3 | 30 | 200 |
| 116 | A | 100 | — | — | AMP16 | 3.5 | B | 11.5 | — | — | 1.3 | 40 | 190 |
| 117 | A | 100 | — | — | AMP17 | 3.5 | C | 11.5 | — | — | 1.4 | 40 | 190 |
| 118 | E | 100 | — | — | AMP18 | 5.2 | C | 5.5 | — | A (0.4) | 1.3 | 40 | 190 |
| 119 | A | 100 | — | — | AMP19 | 5.5 | D | 11.5 | — | — | 1.4 | 40 | 190 |
| 120 | A | 100 | — | — | AMP20 | 5.5 | A | 11.5 | — | — | 1.4 | 40 | 190 |

| Optical compensation film No. | Optical Propertied: Retardation Ro (nm) | Rt (nm) | Ro(480) (nm) | Ro(630) (nm) | Wave dispersion Ro(480)/Ro(630) | Remarks |
|---|---|---|---|---|---|---|
| 101 | 60 | 130 | 57 | 61 | 0.93 | Invention |
| 102 | 55 | 140 | 53 | 56 | 0.95 | Invention |
| 103 | 58 | 120 | 55 | 59 | 0.93 | Invention |
| 104 | 45 | 125 | 40 | 46 | 0.87 | Invention |
| 105 | 52 | 130 | 48 | 53 | 0.91 | Invention |
| 106 | 62 | 125 | 94 | 101 | 0.93 | Invention |
| 107 | 88 | 160 | 80 | 89 | 0.90 | Invention |
| 108 | 70 | 140 | 60 | 71 | 0.85 | Invention |
| 109 | 60 | 120 | 59 | 62 | 0.95 | Invention |
| 110 | 54 | 124 | 52 | 55 | 0.95 | Invention |
| 111 | 50 | 120 | 48 | 51 | 0.94 | Invention |
| 112 | 45 | 115 | 42 | 46 | 0.91 | Invention |
| 113 | 40 | 110 | 37 | 41 | 0.90 | Invention |
| 114 | 54 | 124 | 52 | 55 | 0.95 | Invention |
| 115 | 20 | 70 | 17 | 21 | 0.81 | Invention |
| 116 | 35 | 90 | 31 | 36 | 0.86 | Invention |
| 117 | 44 | 99 | 40 | 45 | 0.89 | Invention |
| 118 | 59 | 119 | 55 | 63 | 0.87 | Invention |
| 119 | 39 | 78 | 35 | 40 | 0.88 | Invention |
| 120 | 45 | 97 | 39 | 45 | 0.87 | Invention |

*1: Parts by weight

TABLE 4

| Optical compensation film No. | Dope composition: Cellulose ester Kind | *1 | Kind | *1 | Polymer (a) Kind | *1 | Sugar ester compound Kind | *1 | Plasticizer (*) | UV Absorber (*) | Manufacture condition: Stretch magnification | Film thickness | Stretch temperature |
|---|---|---|---|---|---|---|---|---|---|---|---|---|---|
| 121 | A | 100 | — | — | AMP1 | 3.5 | B | 11.5 | — | — | 1.4 | 40 | 200 |
| 122 | A | 100 | — | — | AMP2 | 3.5 | C | 11.5 | — | — | 1.2 | 40 | 200 |
| 123 | A | 100 | — | — | AMP3 | 3.5 | D | 11.5 | — | — | 1.3 | 40 | 200 |
| 124 | A | 100 | — | — | AMP4 | 3.5 | D | 0.4 | A (5.5) | | 1.4 | 40 | 180 |
| 125 | C | 100 | — | — | AMP5 | 11.5 | A | 3.5 | — | — | 1.1 | 40 | 175 |
| 126 | C | 100 | — | — | AMP6 | 11.5 | B | 3.5 | — | — | 1.4 | 40 | 175 |

TABLE 4-continued

| | | | | | | | | | | | | | |
|---|---|---|---|---|---|---|---|---|---|---|---|---|---|
| 127 | C | 100 | — | — | AMP7 | 11.5 | C | 3.5 | — | — | 1.5 | 50 | 175 |
| 128 | D | 100 | — | — | AMP8 | 4.9 | B | 0.9 | A (5.5) | — | 1.3 | 40 | 175 |
| 129 | C | 100 | — | — | AMP9 | 11.5 | D | 3.5 | — | — | 1.3 | 60 | 200 |
| 130 | C | 100 | — | — | AMP10 | 11.5 | A | 3.5 | — | — | 1.3 | 40 | 175 |
| 131 | C | 100 | — | — | AMP11 | 11.5 | B | 3.5 | — | — | 1.2 | 40 | 175 |
| 132 | C | 100 | — | — | AMP12 | 11.5 | C | 3.5 | — | — | 1.4 | 60 | 175 |
| 133 | C | 100 | — | — | AMP13 | 11.5 | D | 3.5 | — | — | 1.4 | 60 | 175 |
| 134 | C | 100 | — | — | AMP14 | 11.5 | D | 0.5 | C (5.1) | | 1.5 | 60 | 160 |
| 201 | A | 100 | — | — | — | — | — | — | A (5.5) | — | 1.4 | 40 | 175 |
| 202 | A | 100 | — | — | — | — | A | 11.0 | — | — | 1.4 | 40 | 175 |
| 203 | A | 100 | — | — | AMP1 | 25.0 | — | 0.0 | — | — | 1.4 | 50 | 175 |

| | Optical Propertied | | | | | |
|---|---|---|---|---|---|---|
| | Retardation | | | | | |
| Optical compensation film No. | Ro (nm) | Rt (nm) | Ro (480) (nm) | Ro (630) (nm) | Wave dispersion Ro(480)/Ro(630) | Remarks |
| 121 | 37 | 94 | 35 | 38 | 0.92 | Invention |
| 122 | 22 | 60 | 20 | 23 | 0.87 | Invention |
| 123 | 38 | 55 | 34 | 39 | 0.87 | Invention |
| 124 | 58 | 120 | 51 | 59 | 0.86 | Invention |
| 125 | 20 | 200 | 18 | 21 | 0.86 | Invention |
| 126 | 70 | 150 | 67 | 71 | 0.94 | Invention |
| 127 | 65 | 160 | 61 | 66 | 0.92 | Invention |
| 128 | 61 | 122 | 56 | 63 | 0.89 | Invention |
| 129 | 100 | 70 | 93 | 101 | 0.92 | Invention |
| 130 | 45 | 110 | 44 | 47 | 0.94 | Invention |
| 131 | 37 | 103 | 36 | 38 | 0.95 | Invention |
| 132 | 96 | 180 | 93 | 98 | 0.95 | Invention |
| 133 | 84 | 130 | 81 | 85 | 0.95 | Invention |
| 134 | 88 | 160 | 80 | 89 | 0.90 | Invention |
| 201 | 30 | 100 | 27 | 36 | 0.75 | Comparative |
| 202 | 45 | 110 | 37 | 46 | 0.80 | Comparative |
| 203 | 63 | 130 | 52 | 65 | 0.80 | Comparative |

*1: Parts by weight

It is understood that the optical compensate films 101 to 134 according to this invention obtain desirable retardation and are excellent in wave dispersion property in comparison with the comparative films.

Example 2

Manufacturing Polarizing Plate

Polyvinyl alcohol film having thickness of 120 mm was stretched mono-axially at 110° C. with stretch magnification of 5 times. This was immersed in aqueous solution containing 0.075 g of iodine and 5 g of potassium iodide in 100 g of water for 60 seconds, and then was immersed in aqueous solution containing 6 g of potassium iodide and 7.5 g of boric acid in 100 g of water at 68° C. A polarizing plate was obtained by water washing and drying.

Next, polarizing plates were prepared in accordance with the following steps 1 to 5, wherein the polarizing film and the optical compensation films of the present invention 101 to 134 and comparative samples 201 to 203 were adhered onto the front side and a Konica Minolta TAC KC4UY (cellulose ester film manufactured by Konica Minolta Opt. Corp.) was adhered on the back side.

Step 1: The optical compensation film was immersed for 90 seconds in 2 mol/L of sodium hydroxide solution at 60° C. and then washed and dried, and the optical compensation film subjected to saponification on one side to be adhered to a polarizing element was obtained.

Step 2: The polarizing film was immersed in a tank of polyvinyl alcohol adhesive having a solid content of 2% by weight for 1 to 2 seconds.

Step 3: Excess adhesive attached to the polarizing film in Step 2 was gently wiped off and then the polarizing film was placed on the cellulose ester film processed in Step 1.

Step 4: Each of the cellulose ester films 101 to 134 and 201 to 203 having the polarizing film stacked in Step 3 was adhered to the cellulose ester films on the back side at a pressure of 20 to 30 N/cm$^2$ and a conveyance speed of approximately 2 m/minute.

Step 5: The samples in which each of the optical compensation films 101 to 134 and 201 to 203, the polarizing film and Konica Minolta TAC KC4UY were adhered in Step 4 were dried for 2 minutes in a dryer at 80° C., and the polarizing plates 101 to 134 of the present invention and the comparative polarizing plates 201 to 203 were prepared.

An amount of light leakage was measured for each of the obtained polarizing plate. Results are shown in Table 5.

<<Evaluation of an Amount of Light Leakage>>

Two sheets of the prepared polarizing plates were arranged in the state of cross Nicol, and the transmittance (T1) at 590 nm was measured by the use of the spectrophotometer U3100 manufactured by Hitachi, Ltd.

Further, after the two sheets of the polarizing plates were processed on the condition of 80° C. 90% RH for 100 hours, the transmittance (T2) when the two sheets of the prepared polarizing plates were arranged in the state of cross Nicol as same as the above was measured, a change of the transmittance before and after the thermal treatment was investigated, and an amount of light leakage was measured in accordance with the following formula.

$$\text{Amount (\%) of light leakage}=T2(\%)-T1(\%)$$

The amount of light leakage is preferably 0 to 1.5%, and more preferably 1% or less.

<Production of a Liquid Crystal Display>

A liquid crystal panel for view field angle measurement was produced as follows, and the characteristics as a liquid crystal display was evaluated.

The polarizing plates preliminarily adhered on both sides of a 40 type display KLV-40V 1000 manufactured by SONY Corp. were removed, and the polarizing plates 101 to 134, 201 to 203 which prepared as mentioned above were adhered onto both sides of a glass surface of a liquid crystal cell respectively. At this time, the polarizing plates were adhered in such a direction that the plane of the cellulose ester film of the present invention became the liquid crystal cell side and the absorption axis was directed to the same direction as the preliminarily adhered polarizing plate, whereby the liquid crystal displays 101 to 134 of the present invention and the comparative liquid crystal displays 201 to 203 were produced respectively.

These liquid crystal displays were evaluated in terms of uneven color tone and front contrast. Results are shown in Table 5.

<<Evaluation of Uneven Color Tone>>

The uneven color tone was measured by use of a measuring device (EZ-Contrast 160D manufactured by ELDIM) for each of the liquid crystal displays produced as mentioned above as follows. The maximum uneven color tone range (Δ u'v') was compared in CIE 1976, UCS coordinate, the display was inclined 60° from normal direction and observed during rotating 360°.

<<Evaluation of Front Contrast>>

In the environment of 23° C. 55% RH, after the backlight of each of the liquid crystal displays was continuously lighted for one week, the measurement was performed. EZ-Contrast 160D manufactured by ELDIM was used for the measurement in such a way that the luminance from the normal line direction of the display screen was measured on a white display mode and a black display mode of the liquid crystal display, and the ratio between the luminance values on the white display mode and the black display mode was made as the front contrast.

Front contrast=(luminance on the white display mode measured from the normal line direction of the display device)/(luminance on the black display mode measured from the normal line direction of the display device)

TABLE 5

| Optical compensation film No. | Light leakage | Liquid crystal display No. | Uneven color tone (Δ u'v') | Front contrast | Remarks |
|---|---|---|---|---|---|
| 101 | 0.15 | 101 | 0.05 | 1270 | Invention |
| 102 | 0.25 | 102 | 0.07 | 1250 | Invention |
| 103 | 0.65 | 103 | 0.06 | 1220 | Invention |
| 104 | 0.85 | 104 | 0.07 | 1220 | Invention |
| 105 | 0.15 | 105 | 0.06 | 1230 | Invention |
| 106 | 0.15 | 106 | 0.04 | 1270 | Invention |
| 107 | 0.15 | 107 | 0.04 | 1240 | Invention |
| 108 | 0.25 | 108 | 0.05 | 1220 | Invention |
| 109 | 0.25 | 109 | 0.05 | 1210 | Invention |
| 110 | 0.25 | 110 | 0.05 | 1250 | Invention |
| 111 | 0.15 | 111 | 0.05 | 1250 | Invention |
| 112 | 0.25 | 112 | 0.05 | 1250 | Invention |
| 113 | 0.35 | 113 | 0.06 | 1250 | Invention |
| 114 | 0.35 | 114 | 0.07 | 1250 | Invention |
| 115 | 0.15 | 115 | 0.06 | 1200 | Invention |
| 116 | 0.65 | 116 | 0.06 | 1270 | Invention |

TABLE 5-continued

| Optical compensation film No. | Light leakage | Liquid crystal display No. | Uneven color tone (Δ u'v') | Front contrast | Remarks |
|---|---|---|---|---|---|
| 117 | 0.45 | 117 | 0.05 | 1250 | Invention |
| 118 | 0.45 | 118 | 0.05 | 1250 | Invention |
| 119 | 0.35 | 119 | 0.07 | 1240 | Invention |
| 120 | 0.45 | 120 | 0.06 | 1250 | Invention |
| 121 | 0.35 | 121 | 0.07 | 1230 | Invention |
| 122 | 0.55 | 122 | 0.06 | 1240 | Invention |
| 123 | 0.25 | 123 | 0.06 | 1250 | Invention |
| 124 | 0.45 | 124 | 0.07 | 1260 | Invention |
| 125 | 0.35 | 125 | 0.06 | 1270 | Invention |
| 126 | 0.45 | 126 | 0.06 | 1250 | Invention |
| 127 | 0.45 | 127 | 0.06 | 1230 | Invention |
| 128 | 0.15 | 128 | 0.04 | 1240 | Invention |
| 129 | 0.35 | 129 | 0.05 | 1260 | Invention |
| 130 | 0.45 | 130 | 0.06 | 1250 | Invention |
| 131 | 0.35 | 131 | 0.07 | 1230 | Invention |
| 132 | 0.25 | 132 | 0.05 | 1220 | Invention |
| 133 | 0.35 | 133 | 0.07 | 1220 | Invention |
| 134 | 0.45 | 134 | 0.08 | 1220 | Invention |
| 201 | 4.8 | 201 | 0.17 | 900 | Comparative |
| 202 | 4.5 | 202 | 0.15 | 950 | Comparative |
| 203 | 4.6 | 203 | 0.18 | 980 | Comparative |

It is apparent that the polarizing plates of this invention 101 to 134 are excellent in light leakage. It is also apparent that the liquid crystal displays of this invention 101 to 134 are excellent in uneven color tone and front contrast.

The invention claimed is:

1. A manufacturing method of an optical compensation film comprising;

dissolving cellulose ester composition in a solvent to form a dope;

casting the dope on a support; and drying the cast dope;

wherein the cellulose ester composition comprises:

a cellulose ester,

Polymer (a), and

Compound (b), wherein

Polymer (a) is a copolymer of an ethylenically unsaturated monomer of N-vinyl pyrrolidone, N-acryloyl morpholine, N-vinyl piperidone, N-vinyl caprolactam, or a mixture thereof and at least one ethylenically unsaturated monomer, the polymer (a) having a weight average molecular weight (Mw) of 1,000 to 70,000, and Compound (b) is an esterified compound in which all or a part of OH groups in Compound (A) having one furanose or pyranose structure are esterified, or an esterified compound in which all or a part of OH groups in Compound (B), in which 2 to 12 structures of at least one of furanose or pyranose structure are bonded, are esterified, and the optical compensation film satisfying Formulas (i) and (ii), $$20 \leq Ro \leq 100 \text{ (nm)} \quad \text{(i)}$$

$$70 \leq Rt \leq 200 \text{ (nm)} \quad \text{(ii)}$$

wherein, $$Ro(nx-ny) \times d$$

$$Rt=((nx+ny)/2-nz) \times d$$

wherein, nx represents a refractive index in retarded phase axis direction in a plane of the optical compensation film, ny represents a refractive index in a direction perpendicular to the retarded phase axis direction in a plane, nz represents a refractive index in a thickness direction and d represents a thickness (nm) of the optical compensation film respectively, the measuring wavelength for the refractive index being 590 nm.

2. The manufacturing method of claim 1, wherein the optical compensation film satisfies Formula (iii), $$0.82 \leq Ro(480)/Ro(630) \leq 0.96 \quad \text{(iii)}$$

wherein,

Ro (480) and Ro (630) represent Ro measured with the wavelength of 480 nm and Ro measured with the wavelength of 630 nm, respectively.

3. The manufacturing method of claim 1, wherein the ethylenically unsaturated monomer is N-vinyl pyrrolidone, N-acryloyl morpholine, or a mixture thereof.

4. The manufacturing method of claim 3, wherein the ethylenically unsaturated monomer is N-acryloyl morpholine.

5. The manufacturing method of claim 1, wherein the esterified compound is benzoate of α-glucose or β-fructose, or benzoate of polysaccharide prepared by dehydration condensation of arbitrary two or more parts of $-OR_{12}$, $-OR_{15}$, $-OR_{22}$ and $-OR_{25}$ in monosaccharide represented by Formula (2), in which m+n=2 to 12, Formula (2)

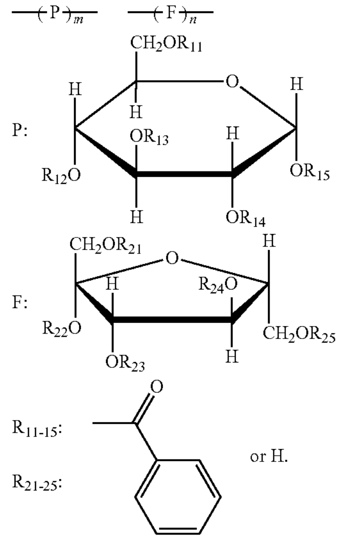

or H.

6. The manufacturing method of claim 1, wherein Compound (A) is glucose, galactose, mannose, fructose, xylose or arabinose.

7. The manufacturing method of claim 1, wherein the solvent is a mixture of a good solvent and a poor solvent of cellulose ester.

* * * * *